United States Patent
Oyamada et al.

(10) Patent No.: US 11,948,098 B2
(45) Date of Patent: Apr. 2, 2024

(54) MEANING INFERENCE SYSTEM, METHOD, AND PROGRAM

(71) Applicant: NEC CORPORATION, Tokyo (JP)

(72) Inventors: Masafumi Oyamada, Tokyo (JP); Kunihiro Takeoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 877 days.

(21) Appl. No.: 16/978,402

(22) PCT Filed: Mar. 8, 2018

(86) PCT No.: PCT/JP2018/008997
§ 371 (c)(1),
(2) Date: Sep. 4, 2020

(87) PCT Pub. No.: WO2019/171538
PCT Pub. Date: Sep. 12, 2019

(65) Prior Publication Data
US 2021/0049483 A1 Feb. 18, 2021

(51) Int. Cl.
*G06F 16/00* (2019.01)
*G06F 16/26* (2019.01)
*G06N 5/04* (2023.01)

(52) U.S. Cl.
CPC .............. *G06N 5/04* (2013.01); *G06F 16/26* (2019.01)

(58) Field of Classification Search
CPC ...................................... G06F 16/26
See application file for complete search history.

(56) References Cited

U.S. PATENT DOCUMENTS

2018/0081871 A1* 3/2018 Williams ................ G06F 16/31

FOREIGN PATENT DOCUMENTS

| JP | 2008-181459 A | 8/2008 |
|---|---|---|
| JP | 2011-232879 A | 11/2011 |
| JP | 2012-181605 A | 9/2012 |
| JP | 2013-120534 A | 6/2013 |
| JP | 2017-021634 A | 1/2017 |
| JP | 6242540 B1 | 12/2017 |
| WO | 2013/132614 A1 | 9/2013 |
| WO | 2016/204996 A1 | 12/2016 |

(Continued)

OTHER PUBLICATIONS

Japanese Office Communication for JP Application No. 2020-504592 dated Nov. 2, 2021 with English Translation.
(Continued)

*Primary Examiner* — Ajith Jacob
(74) *Attorney, Agent, or Firm* — Sughrue Mion, PLLC

(57) ABSTRACT

A column meaning candidate selection means 303 selects a candidate for meaning of a column whose meaning is to be inferred. A column similarity computation means 304 computes, for each candidate for meaning selected by the column meaning candidate selection means 303, a score indicating a similarity between the selected candidate for meaning and meaning of each column other than the column whose meaning is to be inferred contained in a table. A column meaning identification means 305 identifies meaning of the column whose meaning is to be inferred from the candidates for meaning of the column with use of the score computed by the column similarity computation means 304.

13 Claims, 16 Drawing Sheets

(56) References Cited

FOREIGN PATENT DOCUMENTS

WO    2018/025706 A1    2/2018
WO    2018/025707 A1    2/2018

OTHER PUBLICATIONS

Minh Pham, et al., "Semantic labeling: A domain-independent approach", pp. 1-16.
International Search Report for PCT/JP018/008997 dated May 29, 2018 [PCT/ISA/210].
Written Opinion for PCT/JP018/008997 dated May 29, 2018 [PCT/ISA/237].

* cited by examiner

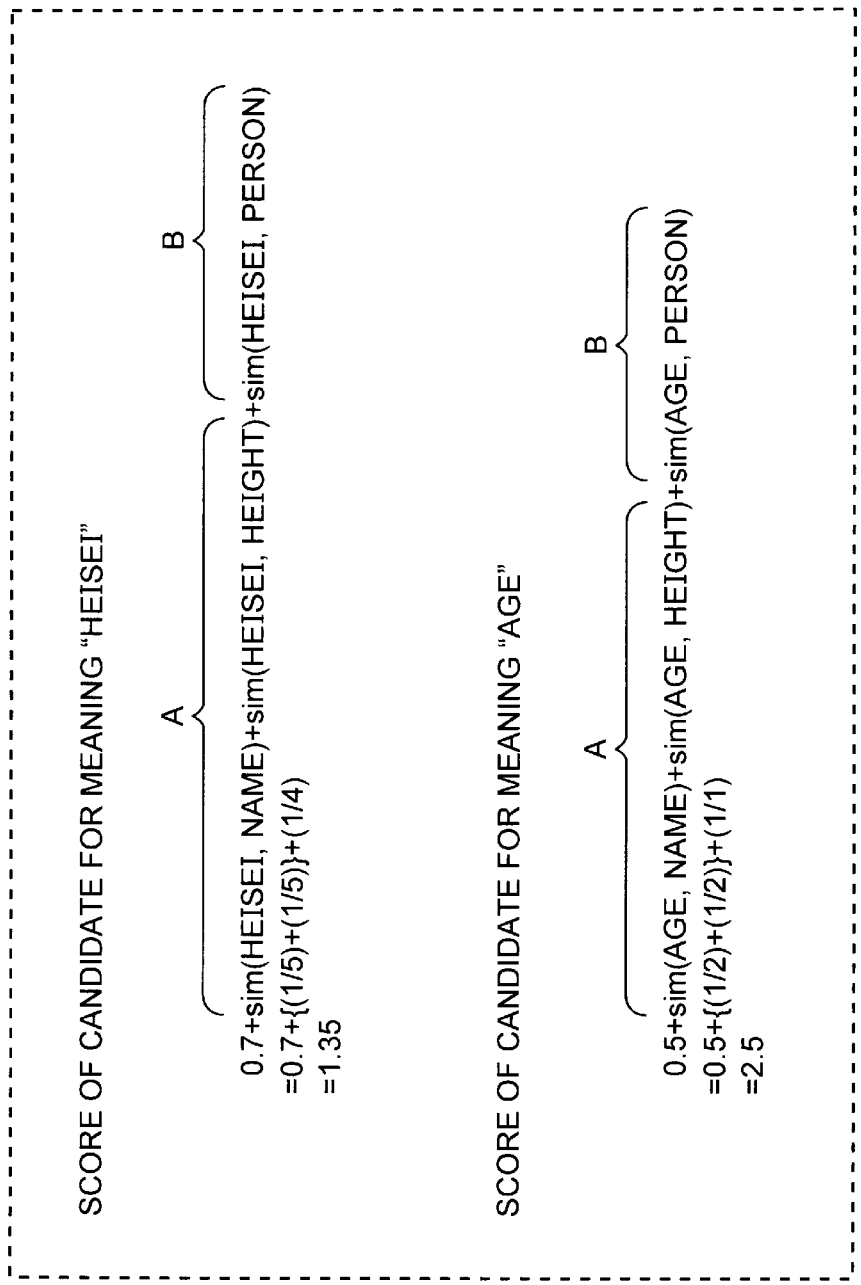

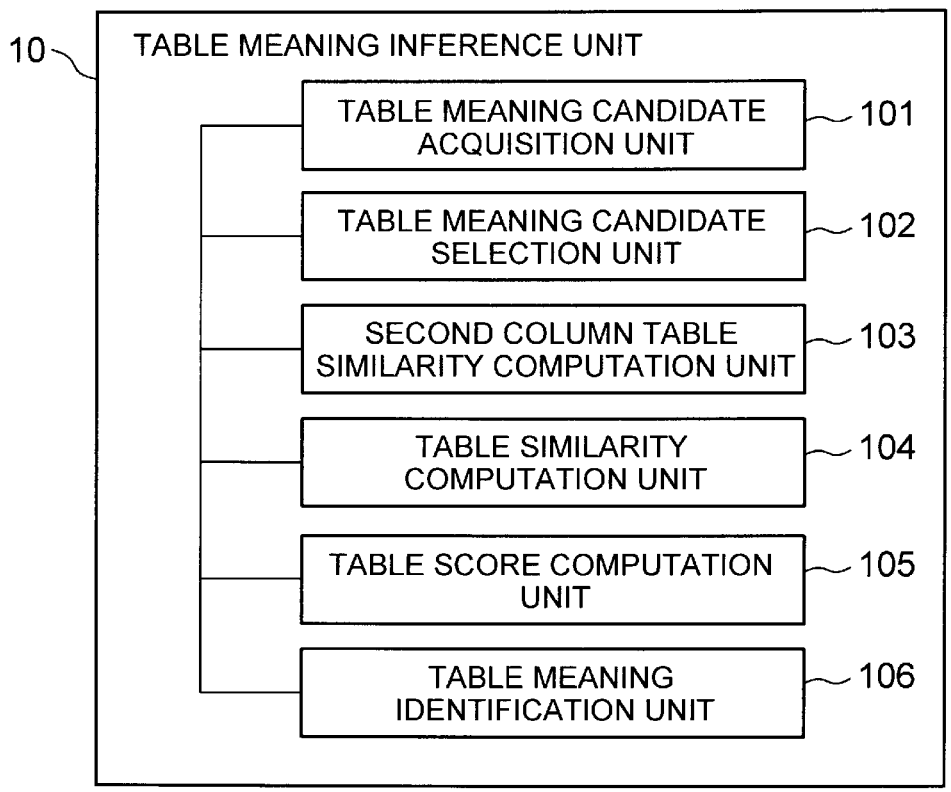

FIG. 14
NAME (4. 5)
PREFECTURE NAME (3. 5)
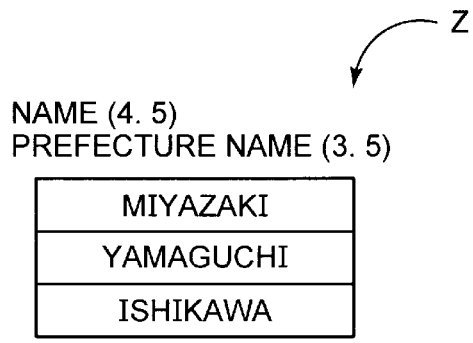
| MIYAZAKI |
| YAMAGUCHI |
| ISHIKAWA |
FIG. 15
RESEARCHER (4. 5)
CUSTOMER (3. 5)
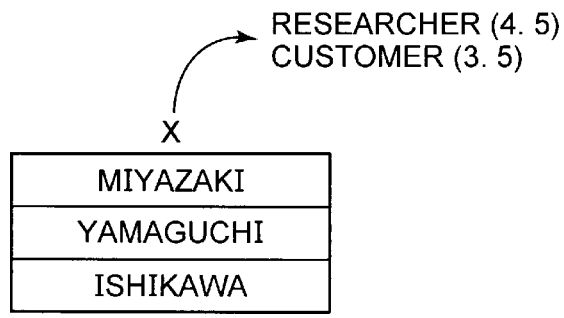
| MIYAZAKI |
| YAMAGUCHI |
| ISHIKAWA |
FIG. 16
Z
| CID | IID | DATE |
|---|---|---|
| 0 | 4 | DECEMBER 20 |
| 1 | 9 | OCTOBER 24 |
| 2 | 12 | JULY 8 |
~51
CUSTOMER (4. 5)
RESEARCHER (3. 5)
| ID | HEIGHT | NAME | AGE |
|---|---|---|---|
| 0 | 178 | OYAMADA | 29 |
| 1 | 170 | TAKEOKA | 24 |
| 2 | 182 | HANAFUSA | 23 |
~52

FIG. 24
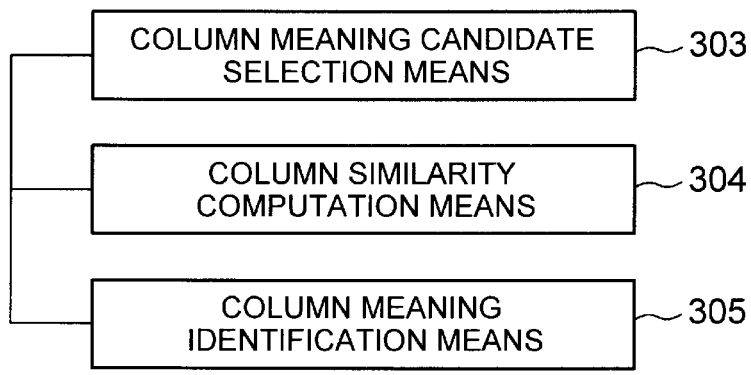
FIG. 25
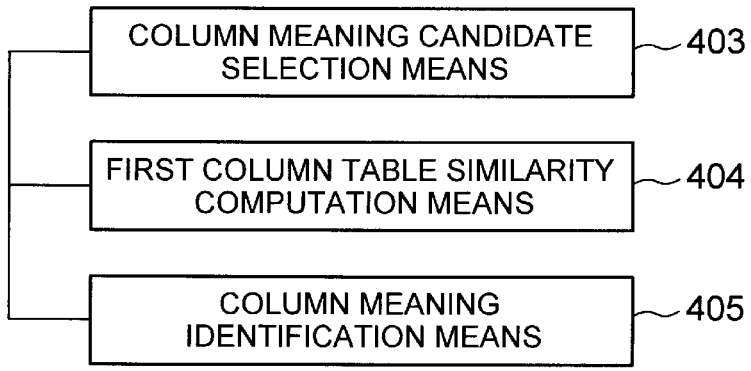
FIG. 26
| OYAMADA | 29 |
| --- | --- |
| TAKEOKA | 24 |
| HANAFUSA | 23 |

MEANING INFERENCE SYSTEM, METHOD, AND PROGRAM

CROSS REFERENCE TO RELATED APPLICATIONS

This is a National Stage of International Application No. PCT/JP2018/008997 filed Mar. 8, 2018.

TECHNICAL FIELD

The present invention relates to a meaning inference system, a meaning inference method, and a meaning inference program for inferring the meaning of each column in a table.

BACKGROUND ART

NPL 1 describes a technique in which features are computed from respective pieces of data contained in a column in a table to determine a label for the column based on the features.

Also, PTL 1 describes a system for inferring the meaning of a table in which the meanings of columns are determined. The system described in PTL 1 selects a finite number of meanings of the table and calculates a probability that each of the selected meanings corresponds to the meaning of the table. The system described in PTL 1 then determines a meaning with the highest probability as the meaning of the table.

The following methods can be raised as general methods for inferring the meaning of a column in a table. In the following description, a case in which each piece of data stored in a column is a numerical value and a case in which each piece of data stored in a column is a character string will be described. Hereinbelow, the former will be referred to as a "first general method", and the latter will be referred to as a "second general method".

First General Method

The first general method is for a case in which each piece of data stored in a column is a numerical value. In the first general method, candidates for meaning of a column storing numerical values and statistical values (for example, an average value and a standard deviation) associated with the candidates are determined in advance. For example, a candidate "Heisei" for meaning of a column and statistical values associated with "Heisei" (for example, an average value "15" and a standard deviation "8.5") are associated and stored in a storage device in advance. Note that "Heisei" is one of the Japanese era names. Also, for example, a candidate "age" for meaning of the column and statistical values associated with "age" (for example, an average value "45" and a standard deviation "20") are associated and stored in the storage device in advance. Here, "Heisei" and "age" are illustrated as candidates for meaning of the column storing the numerical values, and other candidates are also associated with statistical values and are stored in the storage device in advance.

Subsequently, statistical values for the numerical values stored in the column whose meaning is to be inferred are calculated, and a candidate with similar statistical values is determined as the meaning of the column. For example, suppose that a table illustrated in FIG. 26 is given as a table in which the meaning of each column is to be inferred. Since the second column illustrated in FIG. 26 has stored therein numerical values, the first general method may be used. Here, in order to simplify the description, suppose that candidates for meaning of a column storing the numerical values are "Heisei" and "age". A similarity between statistical values for the numerical values stored in the second column illustrated in FIG. 26 and statistical values for "Heisei" is expressed as score (Heisei, {29,24,23}). Similarly, a similarity between the statistical values for the numerical values stored in the second column illustrated in FIG. 26 and statistical values for "age" is expressed as score (age, {29,24,23}). For example, a reciprocal of KL (Kullback-Leibler)-Divergence can be used as the similarity of the statistical values. In the present example, a reciprocal of KL-Divergence is calculated with use of the statistical values for {29,24,23} and the statistical values for "Heisei" to derive score (Heisei, {29,24,23}). Similarly, a reciprocal of KL-Divergence is calculated with use of the statistical values for {29,24,23} and the statistical values for "Heisei" to derive score (age, {29,24,23}). For example, suppose that the following results are obtained.

score (Heisei, {29,24,23})=0.7
score (age, {29,24,23})=0.5

In this case, "Heisei", which has a higher similarity, is determined as the meaning of the second column illustrated in FIG. 26.

Second General Method

The second general method is for a case in which each piece of data stored in a column is a character string. In the second general method, candidates for meaning of a column storing character strings and vectors associated with the candidates are determined in advance. For example, a candidate "name" for meaning of a column and a vector associated with "name" are associated and stored in a storage device in advance. Here, "name" is illustrated as a candidate for meaning of the column storing the character strings, and other candidates are also associated with vectors and are stored in the storage device in advance. Note that a dimension of each vector is common, and that each vector is assumed to be an n-dimensional vector here. Also, the n-dimensional vector is individually set for each candidate for meaning.

Based on character strings stored in a column whose meaning is to be inferred, an n-dimensional vector associated with the column is determined. Respective elements of the n-dimensional vector correspond to various predetermined words such as "weight", "age", "sex", . . . , "Oyamada", "Takeoka", "Hanafusa", . . . . In a case in which an n-dimensional vector associated with a column is to be determined, Bag-of-Words is applied to character strings stored in the column, and the number of times of appearance of each word contained in the character strings stored in the column is derived. Subsequently, by setting the number of times of appearance of the word as a value for the element corresponding to the word, the n-dimensional vector may be determined. For example, in a case in which an n-dimensional vector associated with the first column illustrated in FIG. 26 is to be determined, an n-dimensional vector in which "1" is set to the elements corresponding to "Oyamada", "Takeoka", and "Hanafusa", and in which "0" is set to all the other elements may be determined. Subsequently, a similarity between the n-dimensional vector associated with the column whose meaning is to be inferred and the n-dimensional vector associated in advance with each candidate for meaning may be computed, and a candidate with the highest similarity may be determined as the meaning of the column of interest. As the similarity between the two n-dimensional vectors, a reciprocal of the Euclidean distance between the two n-dimensional vectors may be used, for example. Alternatively, as the similarity between the two n-dimensional vectors, a probability value obtained from the two n-dimensional vectors with use of Naive Bayes may be used, for example. Also, in the above example, although the case in which respective elements of the n-dimensional vector correspond to words has been described as an example, the respective elements of the n-dimensional vector may correspond to various character strings of a predetermined length. In this case, n-gram may be applied to the character strings stored in the column, the number of times of appearance of each of the various character strings of the predetermined length may be derived, and the number of times of appearance of the character string associated with each element (character string of the predetermined length) may be set to the element of the n-dimensional vector.

Also, PTL 2 describes a data processing device associating items in new data in which specifications of the items are unknown with items in known data in which specifications of the items are known.

Also, PTL 3 describes a technique for determining whether or not a plurality of columns having similar attributes are synonymous columns.

Also, PTL 4 describes a table classification device classifying tables based on a similarity between the tables.

Also, PTL 5 describes a system enabling a column having a superordinate conceptual relationship to be automatically extracted from respective columns of a table.

CITATION LIST

Patent Literature

PTL 1: International Publication No. WO2018/025706
PTL 2: Japanese Patent Application Laid-Open No. 2017-21634
PTL 3: Japanese Patent Application Laid-Open No. 2011-232879
PTL 4: Japanese Patent Application Laid-Open No. 2008-181459
PTL 5: Japanese Patent No. 6242540

Non Patent Literature

NPL 1: Minh Pham, and three other persons, "Semantic labeling: A domain-independent approach"

SUMMARY OF INVENTION

Technical Problem

In the above general methods for inferring the meaning of a column, only data stored in the column is used. Therefore, accuracy of inferring the meaning of the column is low. For example, even in a case in which the meaning of the second column illustrated in FIG. 26 is actually "age", an inference result of the meaning of the second column may be "Heisei" as in the above example.

An object of the present invention is to provide a meaning inference system, a meaning inference method, and a meaning inference program enabling the meaning of each column in a table to be inferred with high accuracy.

Solution to Problem

A meaning inference system according to the present invention is a meaning inference system inferring meaning of a column contained in a table and includes a column meaning candidate selection means selecting at least one candidate for meaning of a column whose meaning is to be inferred, a column similarity computation means computing, for each candidate for meaning selected by the column meaning candidate selection means, a score indicating a similarity between the selected candidate for meaning and meaning of each column other than the column whose meaning is to be inferred contained in a table, and a column meaning identification means identifying meaning of the column whose meaning is to be inferred from the candidates for meaning of the column with use of the score computed by the column similarity computation means.

Also, a meaning inference system according to the present invention is a meaning inference system inferring meaning of a column contained in a table and includes a column meaning candidate selection means selecting at least one candidate for meaning of a column whose meaning is to be inferred, a first column table similarity computation means computing, for each candidate for meaning selected by the column meaning candidate selection means, a score indicating a similarity between the selected candidate for meaning and meaning of a table, and a column meaning identification means identifying meaning of the column whose meaning is to be inferred from the candidates for meaning of the column with use of the score computed by the first column table similarity computation means.

Also, a meaning inference method according to the present invention is a meaning inference method inferring meaning of a column contained in a table and includes selecting, by a computer, at least one candidate for meaning of a column whose meaning is to be inferred, executing, by the computer, column similarity computation processing for computing, for each candidate for meaning selected, a score indicating a similarity between the selected candidate for meaning and meaning of each column other than the column whose meaning is to be inferred contained in a table, and identifying, by the computer, meaning of the column whose meaning is to be inferred from the candidates for meaning of the column with use of the score computed in the column similarity computation processing.

Also, a meaning inference method according to the present invention is a meaning inference method inferring meaning of a column contained in a table and includes selecting, by a computer, at least one candidate for meaning of a column whose meaning is to be inferred, executing, by the computer, first column table similarity computation processing for computing, for each candidate for meaning selected, a score indicating a similarity between the selected candidate for meaning and meaning of a table, and identifying, by the computer, meaning of the column whose meaning is to be inferred from the candidates for meaning of the column with use of the score computed in the first column table similarity computation processing.

Also, a meaning inference program according to the present invention is a meaning inference program causing a computer to infer meaning of a column contained in a table and causes the computer to execute column meaning candidate selection processing for selecting at least one candidate for meaning of a column whose meaning is to be inferred, column similarity computation processing for computing, for each candidate for meaning selected in the column meaning candidate selection processing, a score indicating a similarity between the selected candidate for meaning and meaning of each column other than the column whose meaning is to be inferred contained in a table, and column meaning identification processing for identifying meaning of the column whose meaning is to be inferred from the candidates for meaning of the column with use of the score computed in the column similarity computation processing.

Also, a meaning inference program is a meaning inference program causing a computer to infer meaning of a column contained in a table and causes the computer to execute column meaning candidate selection processing for selecting at least one candidate for meaning of a column whose meaning is to be inferred, first column table similarity computation processing for computing, for each candidate for meaning selected in the column meaning candidate selection processing, a score indicating a similarity between the selected candidate for meaning and meaning of a table, and column meaning identification processing for identifying meaning of the column whose meaning is to be inferred from the candidates for meaning of the column with use of the score computed in the first column table similarity computation processing.

Advantageous Effects of Invention

According to the present invention, the meaning of each column in a table can be inferred with high accuracy.

BRIEF DESCRIPTION OF DRAWINGS

FIG. 6 It depicts an explanatory diagram illustrating calculation formulae for scores of candidates for meaning "Heisei" and "age" computed by a column score computation unit.

FIG. 7 It depicts a block diagram illustrating a configuration example of a table meaning inference unit.

FIG. 8 It depicts a schematic view illustrating an example of a table whose meaning is to be inferred.

FIG. 14 It depicts a schematic view illustrating a table containing a column to which a plurality of meanings are allocated and a candidate for meaning of the table.

FIG. 15 It depicts a schematic view illustrating examples of a column whose meaning is to be inferred and a plurality of meanings allocated to a table.

FIG. 16 It depicts a schematic view illustrating examples of a table whose meaning is to be inferred and another table related to the table.

FIG. 24 It depicts a block diagram illustrating an overview of a meaning inference system according to the present invention.

FIG. 25 It depicts a block diagram illustrating another example of an overview of a meaning inference system according to the present invention.

FIG. 26 It depicts a schematic view illustrating an example of a table in which the meaning of each column is to be inferred.

DESCRIPTION OF EMBODIMENTS

Hereinbelow, exemplary embodiments of the present invention will be described with reference to the drawings.

First Exemplary Embodiment

Figure 1:
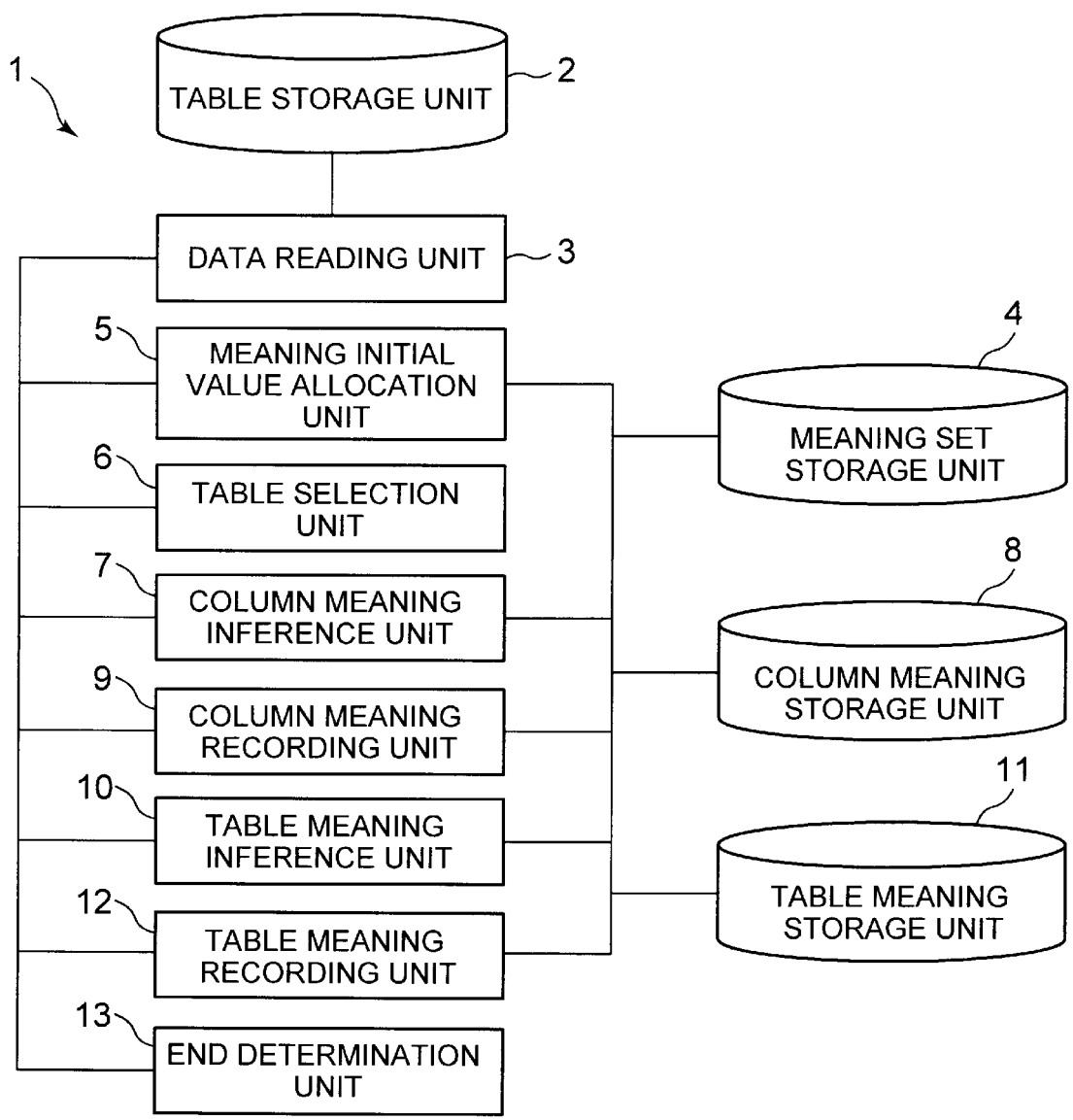
FIG. 1 It depicts a block diagram illustrating a configuration example of a meaning inference system according to a first exemplary embodiment of the present invention.

FIG. 1 depicts a block diagram illustrating a configuration example of a meaning inference system according to a first exemplary embodiment of the present invention. In the first exemplary embodiment, the meaning inference system according to the present invention infers both the meaning of each column in a table and the meaning of the table. A meaning inference system 1 according to the present invention includes a table storage unit 2, a data reading unit 3, a meaning set storage unit 4, a meaning initial value allocation unit 5, a table selection unit 6, a column meaning inference unit 7, a column meaning storage unit 8, a column meaning recording unit 9, a table meaning inference unit 10, a table meaning storage unit 11, a table meaning recording unit 12, and an end determination unit 13.

The table storage unit 2 is a storage device storing a table in which the meaning of each column and the meaning of the table are not determined. The meaning inference system 1 according to the first exemplary embodiment infers the meaning of each column in a table stored in the table storage unit 2 and the meaning of the table. That is, the table storage unit 2 stores a table for which the meaning of each column and the meaning of the table are to be inferred. For example, an administrator of the meaning inference system 1 may store in advance in the table storage unit 2 a table in which the meaning of each column and the meaning of the table are not determined. The fact that the administrator has stored a table in which the meaning of each column and the meaning of the table are not determined in the table storage unit 2 means that a table for which the meaning of each column and the meaning of the table are to be inferred is given.

The table storage unit 2 may store one or a plurality of tables for which the meaning of each column and the meaning of the table are to be inferred. However, in a case in which the plurality of tables are stored, and in which there are a plurality tables related to each other by a primary key and a foreign key, the table storage unit 2 also stores in advance information indicating which table is related to which table. The information indicating which table is related to which table may be stored in the table storage unit 2 in advance by the administrator, for example.

The following description will be provided on the assumption that the table storage unit 2 stores a plurality of tables for each of which the meaning of each column and the meaning of the table are to be inferred and information indicating which table is related to which table.

The data reading unit 3 reads from the table storage unit 2 all tables for each of which the meaning of each column and the meaning of the table are to be inferred. The data reading unit 3 also reads from the table storage unit 2 all information indicating which table is related to which table.

The meaning set storage unit 4 is a storage device storing candidates for meaning of a column and candidates for meaning of a table. In the present exemplary embodiment, description will be provided on the assumption that the meaning set storage unit 4 stores a concept dictionary in which the candidates for meaning of the table and the candidates for meaning of the table are used as nodes. The concept dictionary is expressed as a graph in which the candidates for meaning of the table and the candidates for meaning of the table are used as nodes, and in which candidates (nodes) having similar meanings are connected by links.

Figure 2:
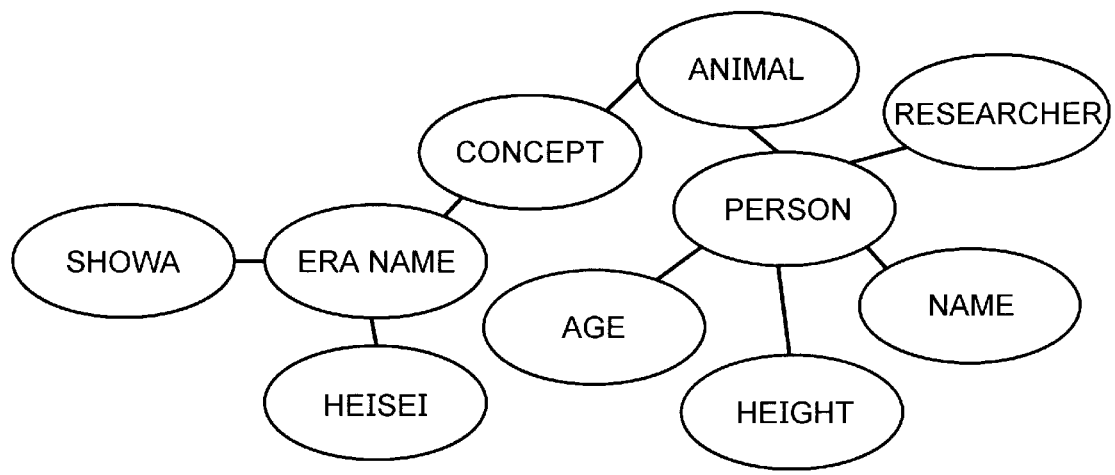
FIG. 2 It depicts a schematic view illustrating an example of a concept dictionary.

FIG. 2 depicts a schematic view illustrating an example of the concept dictionary. However, FIG. 2 is an example of the concept dictionary, and the number of nodes contained in the concept dictionary is not limited to one in the example illustrated in FIG. 2. The number of nodes contained in the concept dictionary is finite. Each node in the concept dictionary illustrated in FIG. 2 is a candidate for meaning of a column or a candidate for meaning of a table. In the concept dictionary, candidates (nodes) having similar meanings are connected by links. Therefore, a score indicating a similarity between one meaning and another meaning can be expressed by a reciprocal of the number of hops between the two meanings in the concept dictionary.

The concept dictionary stored in the meaning set storage unit 4 may be a concept dictionary opened to the public or a concept dictionary created by the administrator of the meaning inference system 1.

The meaning initial value allocation unit 5 allocates to each of a plurality of tables read by the data reading unit 3 (that is, a plurality of given tables) an initial value for meaning of the table and an initial value for meaning of each column contained in the table. The initial value for meaning is meaning initially allocated at the time of start of processing.

At the time of allocating an initial value for meaning of each of given tables, the meaning initial value allocation unit 5 may randomly select a candidate for meaning serving as a node in the concept dictionary and may allocate the candidate for meaning as the initial value. Similarly, at the time of allocating an initial value for meaning of each column contained in each of the tables, the meaning initial value allocation unit 5 may randomly select a candidate for meaning serving as a node in the concept dictionary and may allocate the candidate for meaning as the initial value.

Also, at the time of allocating an initial value for meaning of each column contained in each of the tables, the meaning initial value allocation unit 5 may allocate an initial value for meaning of each column by means of the aforementioned general methods for inferring the meaning of a column. In this case, in a case in which each piece of data stored in the column is a numerical value, the meaning initial value allocation unit 5 may allocate an initial value for meaning of the column by means of the aforementioned first general method. Also, in a case in which each piece of data stored in the column is a character string, the meaning initial value allocation unit 5 may allocate an initial value for meaning of the column by means of the aforementioned second general method. The meanings selected by the first general method and the second general method are ones contained in the concept dictionary as nodes. Also, before the meaning initial value allocation unit 5 allocates an initial value for meaning of the table, the meaning initial value allocation unit 5 may allocate an initial value for meaning of each column contained in the table, thereafter derive the meaning of the table by means of the method described in PTL 1, and allocate the meaning as the initial value for meaning of the table. The meaning obtained by the method described in PTL 1 is one contained in the concept dictionary as a node.

The table selection unit 6 sequentially selects tables one by one from among all the tables after the initial values for meaning of the respective columns and the meanings of the tables have been allocated.

The column meaning inference unit 7 infers the meaning of each column contained in a table selected by the table selection unit 6. The column meaning inference unit 7 will be described in detail below with reference to FIG. 3.

The column meaning storage unit 8 is a storage device storing the meaning of each column in each table. When the meaning of each column contained in the selected table is inferred by the column meaning inference unit 7, the column meaning recording unit 9 causes an inference result of the meaning of each column of the table to be stored in the column meaning storage unit 8.

The table meaning inference unit 10 infers the meaning of a table selected by the table selection unit 6. The table meaning inference unit 10 will be described in detail below with reference to FIG. 7.

The table meaning storage unit 11 is a storage device storing the meaning of each table. When the meaning of the selected table is inferred by the table meaning inference unit 10, the table meaning recording unit 12 causes an inference result of the meaning of the table to be stored in the table meaning storage unit 11.

In the meaning inference system 1, a process in which the table selection unit 6 selects each of all the tables, in which the column meaning inference unit 7 infers the meaning of each column contained in the selected table, and in which the table meaning inference unit 10 infers the meaning of the selected table is repeatedly executed. Therefore, the meaning of each column of each table stored in the column meaning storage unit 8 and the meaning of each table stored in the table meaning storage unit 11 are updated as the above process is repeated. Hereinbelow, the process repeated in this manner may be referred to as a repetitive process.

The end determination unit 13 determines whether or not a condition for an end of repetition of the above process is satisfied. Examples of the end condition include a condition in which the number of repetitions of the above process has reached a predetermined number and a condition in which the meaning of each column contained in each table and the meaning of each table are no longer updated. However, examples of the end condition are not limited to these examples.

Figure 3:
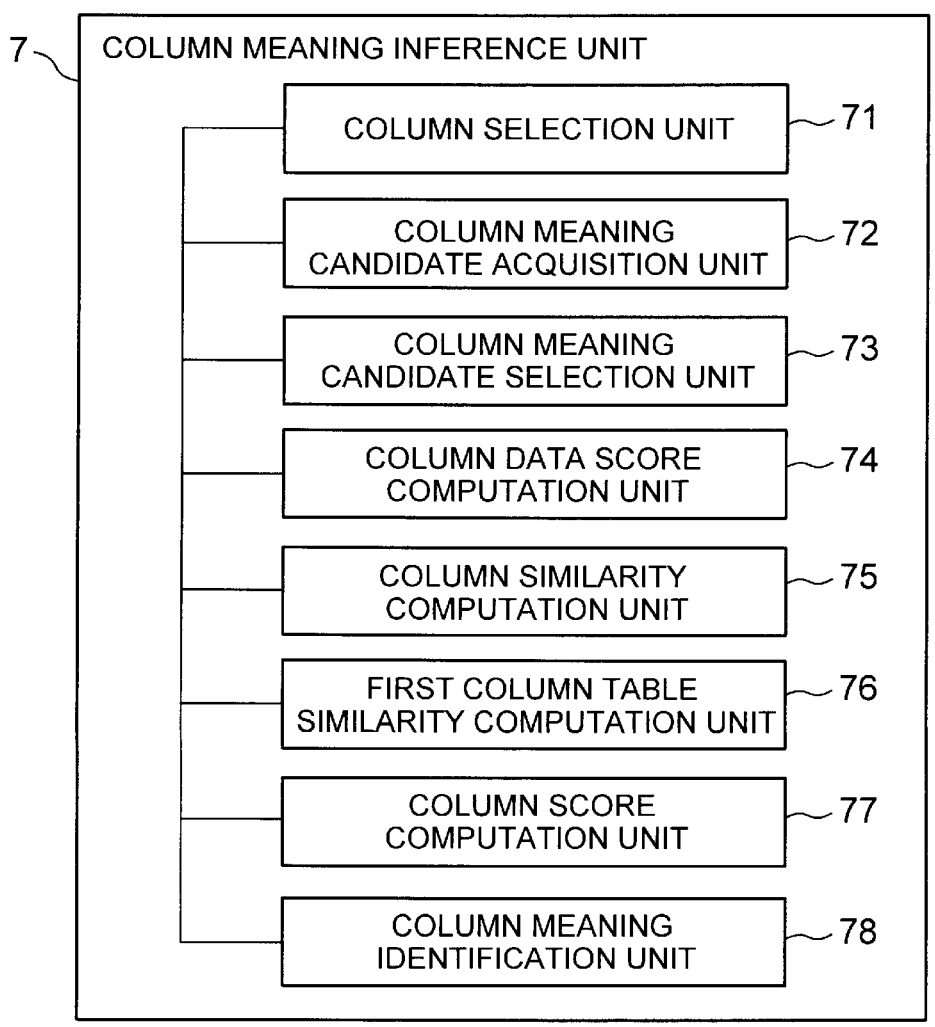
FIG. 3 It depicts a block diagram illustrating a configuration example of a column meaning inference unit.

Next, the column meaning inference unit 7 will be described further in detail. FIG. 3 depicts a block diagram illustrating a configuration example of the column meaning inference unit 7. The column meaning inference unit 7 includes a column selection unit 71, a column meaning candidate acquisition unit 72, a column meaning candidate selection unit 73, a column data score computation unit 74, a column similarity computation unit 75, a first column table similarity computation unit 76, a column score computation unit 77, and a column meaning identification unit 78.

The column selection unit 71 sequentially selects columns each of whose meaning is to be inferred one by one from among the respective columns contained in the table selected by the table selection unit 6. A column selected by the column selection unit 71 is a column whose meaning is to be inferred.

The column meaning candidate acquisition unit 72 acquires a plurality of candidates for meaning of the column selected by the column selection unit 71 from the candidates for meaning stored in the meaning set storage unit 4. The nodes in the concept dictionary correspond to candidates for meaning. The column meaning candidate acquisition unit 72 may acquire all the candidates for meaning which the nodes in the concept dictionary correspond to. Alternatively, the column meaning candidate acquisition unit 72 may select k arbitrary nodes from the nodes in the concept dictionary and acquire k candidates for meaning which these nodes correspond to. Alternatively, the column meaning candidate acquisition unit 72 may identify a node in the concept dictionary which corresponds to the meaning currently allocated to the selected column, select k nodes within a predetermined number of hops from the node, and acquire k candidates for meaning which these nodes correspond to. A value for k and a value for the predetermined number of hops may be set as constants in advance.

The plurality of candidates for meaning acquired by the column meaning candidate acquisition unit 72 will be referred to as a column meaning candidate set.

The column meaning candidate selection unit 73 sequentially selects candidates for meaning one by one from the column meaning candidate set.

Based on each piece of data stored in the column selected by the column selection unit 71, the column data score computation unit 74 computes a score indicating the degree to which a candidate for meaning selected by the column meaning candidate selection unit 73 corresponds to the meaning of the selected column. The column data score computation unit 74 may compute as this score a similarity derived by the aforementioned general methods for inferring the meaning of a column, for example. For example, in a case in which each piece of data stored in the selected column is a numerical value, the column data score computation unit 74 may compute a reciprocal of KL-Divergence with use of statistical values for the numerical value and statistical values associated with the selected candidate for meaning and use the value as the score. Further, for example, in a case in which each piece of data stored in the selected column is a character string, the column data score computation unit 74 may determine an n-dimensional vector based on each character string and use as the score a reciprocal of the Euclidean distance between the n-dimensional vector and an n-dimensional vector associated with the selected candidate for meaning. Alternatively, the column data score computation unit 74 may use as the score a probability value obtained from the two n-dimensional vectors with use of Naive Bayes. Note that the statistical values and n-dimensional vectors associated with various candidates for meaning may be stored in a storage device (not illustrated in FIG. 1) for storing these pieces of data in advance, for example.

Note that a method for computing the score indicating the degree to which the selected candidate for meaning corresponds to the meaning of the selected column (a method for computing the score in the column data score computation unit 74) is not limited to the above examples. The column data score computation unit 74 may compute the score in another method.

The column similarity computation unit 75 computes a score indicating a similarity between the meaning of each column other than the column whose meaning is to be inferred (the column selected by the column selection unit 71) in the table selected by the table selection unit 6 and the candidate for meaning selected by the column meaning candidate selection unit 73. Meanwhile, since the meaning initial value allocation unit 5 allocates initial values for meaning to all the columns of all the tables, a meaning has been allocated to each column in the selected table even in a case in which the column similarity computation unit 75 operates in the first repetitive process.

Figure 4:
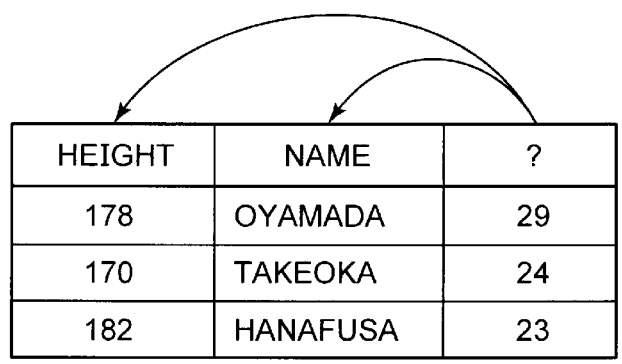
FIG. 4 It depicts a schematic view illustrating examples of a column whose meaning is to be inferred and individual columns other than the column.

FIG. 4 depicts a schematic view illustrating examples of a column whose meaning is to be inferred and individual columns other than the column. The "?" illustrated in FIG. 4 indicates that the column is a column whose meaning is to be inferred (column selected by the column selection unit 71). In the example illustrated in FIG. 4, the third column is a column whose meaning is to be inferred. When the candidate for meaning selected by the column meaning candidate selection unit 73 is X, and the meaning of another column is Y, a similarity between X and Y is expressed as sim(X, Y). The column similarity computation unit 75 sequentially selects the columns other than the column whose meaning is to be inferred one by one, computes a similarity between the meaning of each selected column and the candidate for meaning selected by the column meaning candidate selection unit 73, and computes the total sum of the similarities as the aforementioned score. The column similarity computation unit 75 also derives sim(X, Y) as a reciprocal of the number of hops between X and Y in the concept dictionary. By this computation, the higher the similarity between X and Y is, the higher value sim(X, Y) can be.

Suppose that a candidate for meaning selected by the column meaning candidate selection unit 73 is "Heisei". In this case, the column similarity computation unit 75 computes sim(Heisei, name)+sim(Heisei, height) and sets a computation result as a score indicating a similarity between the meaning of each column other than the column whose meaning is to be inferred and the selected candidate for meaning, "Heisei". Suppose that the concept dictionary is defined as illustrated in FIG. 2. The number of hops between "Heisei" and "name" is "5", and the number of hops between "Heisei" and "height" is also "5". Therefore, in the present example, the score is sim(Heisei, name)+sim(Heisei, height)=(1/5)+(1/5)=0.4.

Also, for example, suppose that a candidate for meaning selected by the column meaning candidate selection unit 73 is "age". In this case, the column similarity computation unit 75 computes sim(age, name)+sim(age, height) and sets a computation result as a score indicating a similarity between the meaning of each column other than the column whose meaning is to be inferred and the selected candidate for meaning, "age". The number of hops between "age" and "name" is "2", and the number of hops between "age" and "height" is also "2" (refer to FIG. 2). Therefore, in the present example, the score is sim(age, name)+sim(age, height)=(1/2)+(1/2)=1.0.

The column similarity computation unit 75 computes the aforementioned score for each of the candidates for meaning selected by the column meaning candidate selection unit 73.

The first column table similarity computation unit 76 computes a score indicating a similarity between the meaning of the table selected by the table selection unit 6 and the candidate for meaning selected by the column meaning candidate selection unit 73 (candidate for meaning of the column whose meaning is to be inferred). Meanwhile, since the meaning initial value allocation unit 5 allocates initial values for meaning to all the tables, a meaning has been allocated to the selected table even in a case in which the first column table similarity computation unit 76 operates in the first repetitive process.

Figure 5:
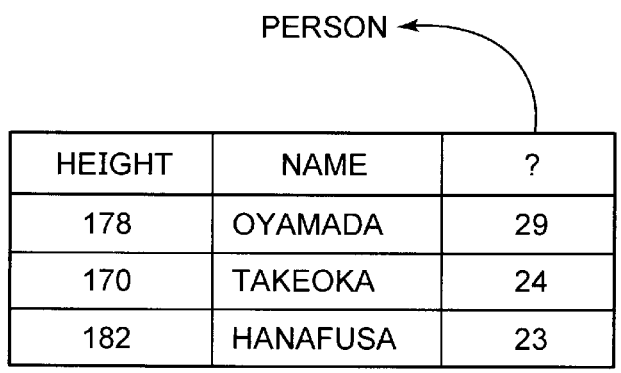
FIG. 5 It depicts a schematic view illustrating examples of a column whose meaning is to be inferred and the meaning of a table containing the column.

FIG. 5 depicts a schematic view illustrating examples of a column whose meaning is to be inferred and the meaning of a table containing the column. Similarly to a case illustrated in FIG. 4, the "?" indicates a column whose meaning is to be inferred (column selected by the column selection unit 71). In the example illustrated in FIG. 5 as well, the third column is a column whose meaning is to be inferred. Also, in the example illustrated in FIG. 5, the meaning allocated to the table is "person". When the candidate for meaning selected by the column meaning candidate selection unit 73 is X, and the meaning of the selected table is Z, a similarity between X and Z is expressed as sim(X, Z). A method for computing sim(X, Z) is similar to the aforementioned method for computing sim(X, Y). That is, the column similarity computation unit 75 may derive sim(X, Z) as a reciprocal of the number of hops between X and Z in the concept dictionary. The higher the similarity between X and Z is, the higher value sim(X, Z) can be. The first column table similarity computation unit 76 computes sim(X, Z) as a score indicating a similarity between the selected candidate X for meaning and the meaning Z of the selected table.

Suppose that a candidate for meaning selected by the column meaning candidate selection unit 73 is "Heisei". In this case, the first column table similarity computation unit 76 sets sim (Heisei, person) as a score indicating a similarity between "Heisei" and "person (meaning of the table illustrated in FIG. 5)". Suppose that the concept dictionary is defined as illustrated in FIG. 2. The number of hops between "Heisei" and "person" is "4". Therefore, the score is sim (Heisei, person)=1/4=0.25.

Also, for example, suppose that a candidate for meaning selected by the column meaning candidate selection unit 73 is age. In this case, the first column table similarity computation unit 76 sets sim(age, person) as a score indicating a similarity between "age" and "person". The number of hops between "age" and "person" is "1" (refer to FIG. 2). Therefore, in the present example, the score is sim(age, person) =1/1=1.0.

The first column table similarity computation unit 76 computes the aforementioned score for each of the candidates for meaning selected by the column meaning candidate selection unit 73.

The column score computation unit 77 computes a score of the candidate for meaning selected by the column meaning candidate selection unit 73 for the selected column (column whose meaning is to be inferred). Specifically, for the selected candidate for meaning, the column score computation unit 77 computes the total sum of scores respectively computed by the column data score computation unit 74, the column similarity computation unit 75, and the first column table similarity computation unit 76 as a score of the selected candidate for meaning of the column.

For example, suppose that the third column illustrated in FIGS. 4 and 5 is selected. Also, suppose that a candidate for meaning selected by the column meaning candidate selection unit 73 is "Heisei". Suppose that, for this column, a score that the column data score computation unit 74 has computed for "Heisei" is 0.7. Also, suppose that the column similarity computation unit 75 has computed sim(Heisei, name)+sim(Heisei, height)=0.4 as a score. Also, suppose that the first column table similarity computation unit 76 has computed sim(Heisei, person)=1/4=0.25 as a score. In this case, the column score computation unit 77 computes 0.7+ 0.4+0.25=1.35 as a score of the candidate for meaning "Heisei" for this column.

Also, suppose that a candidate for meaning selected by the column meaning candidate selection unit 73 is "age". Suppose that, for the same column as above (third column illustrated in FIGS. 4 and 5), a score that the column data score computation unit 74 has computed for "age" is 0.5. Also, suppose that the column similarity computation unit 75 has computed sim(age, name)+sim(age, height)=1.0 as a score. Also, suppose that the first column table similarity computation unit 76 has computed sim(age, person)=1.0 as a score. In this case, the column score computation unit 77 computes 0.5+1.0+1.0=2.5 as a score of the candidate for meaning "age" for this column.

The column score computation unit 77 computes the aforementioned score for each of the candidates for meaning selected by the column meaning candidate selection unit 73.

FIG. 6 depicts an explanatory diagram illustrating calculation formulae for scores of the candidates for meaning "Heisei" and "age" computed by the column score computation unit 77. In FIG. 6, the term indicated by sign A is a term computed by the column similarity computation unit 75. Also, the term indicated by sign B is a term computed by the first column table similarity computation unit 76.

The column meaning identification unit 78 identifies the meaning of the column to be inferred based on the score of each candidate computed by the column score computation unit 77. For example, the column meaning identification unit 78 may identify as the meaning of the column to be inferred a candidate for meaning a score of which computed by the column score computation unit 77 is maximum.

The column meaning recording unit 9 (refer to FIG. 1) causes the meaning identified by the column meaning identification unit 78 to be stored in the column meaning storage unit 8 (refer to FIG. 1) as an inference result of the meaning of the selected column in the selected table.

Also, the column meaning identification unit 78 may identify a plurality of meanings of the column to be inferred. For example, the column meaning identification unit 78 may identify as the meaning of the column to be inferred a predetermined number of candidates for meaning from the top in descending order of rank computed by the column score computation unit 77. Also, for example, the column meaning identification unit 78 may identify as the meaning of the column to be inferred candidates for meaning a score of each of which computed by the column score computation unit 77 is equal to or higher than a threshold value. The threshold value is a predetermined constant. In a case in which a plurality of meanings of the column to be inferred are identified, the column meaning recording unit 9 associates the individual meanings identified with the scores of the meanings (scores computed by the column score computation unit 77) and causes the associated meanings to be stored in the column meaning storage unit 8.

For simplification of the description, the following description will be provided, taking as an example a case in which the column meaning identification unit 78 identifies as the meaning of the column to be inferred a candidate for meaning a score of which computed by the column score computation unit 77 is maximum. That is, a case in which one meaning of the column to be inferred is identified will be described as an example.

Next, the table meaning inference unit 10 will be described further in detail. FIG. 7 depicts a block diagram illustrating a configuration example of the table meaning inference unit 10. The table meaning inference unit 10 includes a table meaning candidate acquisition unit 101, a table meaning candidate selection unit 102, a second column table similarity computation unit 103, a table similarity computation unit 104, a table score computation unit 105, and a table meaning identification unit 106.

The table meaning candidate acquisition unit 101 acquires a plurality of candidates for meaning of the table selected by the table selection unit 6 (refer to FIG. 1) from the candidates for meaning stored in the meaning set storage unit 4. The table meaning candidate acquisition unit 101 may acquire all the candidates for meaning which the nodes in the concept dictionary correspond to. Alternatively, the table meaning candidate acquisition unit 101 may select h arbitrary nodes from the nodes in the concept dictionary and acquire h candidates for meaning which these nodes correspond to. Alternatively, the table meaning candidate acquisition unit 101 may identify a node in the concept dictionary which corresponds to the meaning of the table currently selected, select h nodes within a predetermined number of hops from the node, and acquire h candidates for meaning which these nodes correspond to. A value for h and a value for the predetermined number of hops may be set as constants in advance.

A set of the plurality of meanings acquired by the table meaning candidate acquisition unit 101 will be referred to as a table meaning candidate set.

The table meaning candidate selection unit 102 sequentially selects candidates for meaning one by one from the table meaning candidate set.

The second column table similarity computation unit 103 computes a score indicating a similarity between a candidate for meaning selected by the table meaning candidate selection unit 102 and the meaning of each column in the selected table.

The selected candidate for meaning (candidate for meaning of the table) is set as Z. Also, in a case in which one column is selected from the table, the meaning of the column is set as X. At this time, a similarity between Z and X is expressed as sim(Z, X). A method for computing sim(Z, X) is similar to the aforementioned method for computing sim(X, Y) and sim(Z, X). That is, the second column table similarity computation unit 103 may derive sim(Z, X) as a reciprocal of the number of hops between Z and X in the concept dictionary. The higher the similarity between Z and X is, the higher value sim(Z, X) can be.

The second column table similarity computation unit 103 sequentially selects the columns contained in the selected table one by one, computes a similarity between the candidate for meaning selected by the table meaning candidate selection unit 102 and the meaning of the selected column, and computes the total sum of the similarities as the aforementioned score.

FIG. 8 depicts a schematic view illustrating an example of a table whose meaning is to be inferred (selected table). Suppose that the meaning allocated to the selected table is "person" and that the meanings of the columns contained in the table are "height", "name", and "age". In this case, the second column table similarity computation unit 103 may compute sim(person, height)+sim(person, name)+sim(person, age) as the aforementioned score.

The second column table similarity computation unit 103 computes the aforementioned score for each of the candidates for meaning selected by the table meaning candidate selection unit 102.

The following description will be provided, taking as an example a case in which the second column table similarity computation unit 103 computes the score in the aforementioned method. However, the second column table similarity computation unit 103 may compute the score in another method. For example, the second column table similarity computation unit 103 may compute a probability that the selected candidate for meaning of the table corresponds to the meaning of the table in the method described in PTL 1 and use the probability as the score.

The table similarity computation unit 104 identifies a table related to the selected table based on the information indicating which table is related to which table. There may be a plurality of tables related to the selected table. Note that, as described above, the information indicating which table is related to which table is stored in the table storage unit 2 in advance.

The table similarity computation unit 104 computes a score indicating a similarity between a selected candidate for meaning of the selected table (table whose meaning is to be inferred) and the meaning of each of other tables related to the table. The above selected candidate for meaning (candidate for meaning of the table) is set as Z. Also, suppose that there are m tables related to the selected table. Note that the value form may be 1, or 2 or more. Also, the meanings of the m tables are set as $W_1$ to $W_m$. In this case, the table similarity computation unit 104 may compute the aforementioned score by means of calculation of Equation (1) shown below.

[Mathematical 1]

$$\text{Score} = \sum_{i=1}^{m} sim(Z, W_i) \quad (1)$$

Meanwhile, a method for computing $sim(Z, W_i)$ is similar to the aforementioned method for computing sim(X, Y) and sim(Z, X). That is, the table similarity computation unit 104 may derive $sim(Z, W_i)$ as a reciprocal of the number of hops between Z and $W_i$ in the concept dictionary.

A concept dictionary used by the table similarity computation unit 104 to compute the aforementioned score may be stored in advance in the meaning set storage unit 4 separately from the concept dictionary described above. In a case in which a concept dictionary used by the table similarity computation unit 104 to compute the aforementioned score is used separately from the concept dictionary described above, the concept dictionary is referred to as a second concept dictionary. In the second concept dictionary, the meanings of tables that tend to be related to each other are connected by links. However, without providing a concept dictionary for the table similarity computation unit 104 (second concept dictionary), the table similarity computation unit 104 may derive a reciprocal of the number of hops with use of the common concept dictionary to one used by the column similarity computation unit 75, the first column table similarity computation unit 76, and the second column table similarity computation unit 103.

Figure 9:
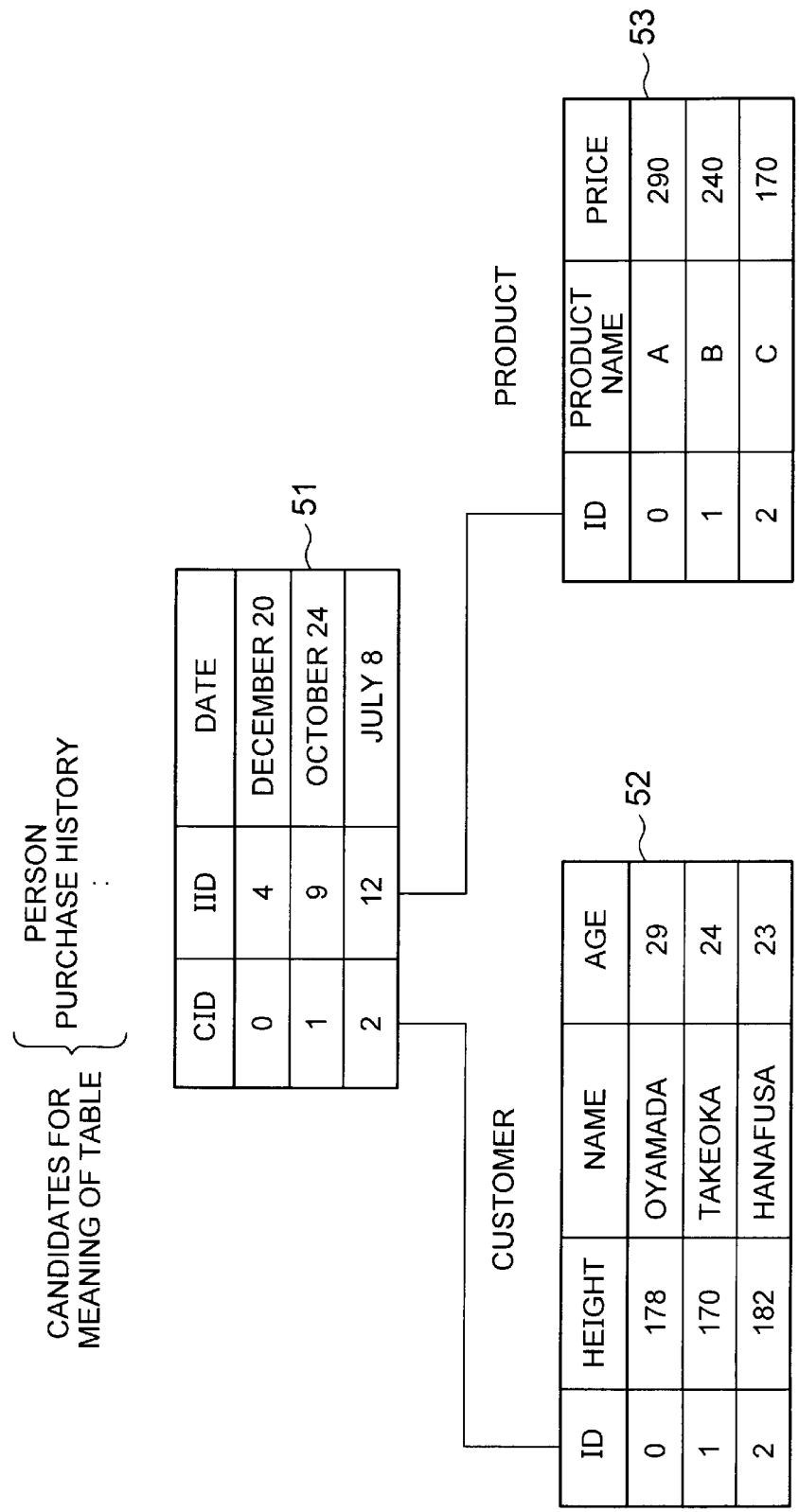
FIG. 9 It depicts a schematic view illustrating examples of a plurality of related tables.

FIG. 9 depicts a schematic view illustrating examples of a plurality of related tables. Suppose that, in the example illustrated in FIG. 9, a table 51 is a selected table (table whose meaning is to be inferred). Also, suppose that tables 52 and 53 are tables related to the table 51. Meanwhile, in FIG. 9, "CID" is synonymous with "Customer ID", and "IID" is synonymous with "Item ID". Suppose that the meaning of the table 52 is "customer" and the meaning of the table 53 is "product". Also, suppose that the table meaning candidate set in the table 51 includes "person", "purchase history", and the like. In the present example, m=2, "customer" corresponds to $W_1$, and "product" corresponds to $W_2$.

For example, in a case in which a selected candidate for meaning of the table 51 is "person", the table similarity computation unit 104 may derive the aforementioned score by means of computation of sim(person, customer)+sim(person, product). Also, for example, in a case in which a selected candidate for meaning of the table 51 is "purchase history", the table similarity computation unit 104 may derive the aforementioned score by means of computation of sim (purchase history, customer)+sim(purchase history, product).

The table similarity computation unit 104 computes the aforementioned score for each of the candidates for meaning selected by the table meaning candidate selection unit 102.

The table score computation unit 105 computes the sum of the score computed by the second column table similarity computation unit 103 and the score computed by the table similarity computation unit 104 for each of the candidates for meaning of the table whose meaning is to be inferred selected by the table meaning candidate selection unit 102.

The table meaning identification unit 106 identifies the meaning of the table to be inferred based on the score of each candidate computed by the table score computation unit 105. For example, the table meaning identification unit 106 may identify as the meaning of the table to be inferred a candidate for meaning a score of which computed by the table score computation unit 105 is maximum.

The table meaning recording unit 12 (refer to FIG. 1) causes the meaning identified by the table meaning identification unit 106 to be stored in the table meaning storage unit 11 (refer to FIG. 1) as an inference result of the meaning of the selected table.

Also, the table meaning identification unit 106 may identify a plurality of meanings of the table to be inferred. For example, the table meaning identification unit 106 may identify as the meaning of the table to be inferred a predetermined number of candidates for meaning from the top in descending order of rank computed by the table score computation unit 105. Also, for example, the table meaning identification unit 106 may identify as the meaning of the table to be inferred candidates for meaning a score of each of which computed by the table score computation unit 105 is equal to or higher than a threshold value. The threshold value is a predetermined constant. In a case in which a plurality of meanings of the table to be inferred are identified, the table meaning recording unit 12 associates the individual meanings identified with the scores of the meanings (scores computed by the table score computation unit 105) and causes the associated meanings to be stored in the table meaning storage unit 11.

For simplification of the description, the following description will be provided, taking as an example a case in which the table meaning identification unit 106 identifies as the meaning of the table to be inferred a candidate for meaning a score of which computed by the table score computation unit 105 is maximum. That is, a case in which one meaning of the table to be inferred is identified will be described as an example.

The functions of the data reading unit 3, the meaning initial value allocation unit 5, the table selection unit 6, the column meaning inference unit 7 (the column selection unit 71, the column meaning candidate acquisition unit 72, the column meaning candidate selection unit 73, the column data score computation unit 74, the column similarity computation unit 75, the first column table similarity computation unit 76, the column score computation unit 77, and the column meaning identification unit 78), the column meaning recording unit 9, the table meaning inference unit 10 (the table meaning candidate acquisition unit 101, the table meaning candidate selection unit 102, the second column table similarity computation unit 103, the table similarity computation unit 104, the table score computation unit 105, and the table meaning identification unit 106), the table meaning recording unit 12, and the end determination unit 13 are fulfilled by a processor (for example, a central processing unit (CPU), a graphics processing unit (GPU), or a field-programmable gate array (FPGA)) of a computer that operates in accordance with a meaning inference program, for example. In this case, the processor reads the meaning inference program from a program recording medium such as a program storage device. The processor may then operate in accordance with the meaning inference program as the data reading unit 3, the meaning initial value allocation unit 5, the table selection unit 6, the column meaning inference unit 7 (the column selection unit 71, the column meaning candidate acquisition unit 72, the column meaning candidate selection unit 73, the column data score computation unit 74, the column similarity computation unit 75, the first column table similarity computation unit 76, the column score computation unit 77, and the column meaning identification unit 78), the column meaning recording unit 9, the table meaning inference unit 10 (the table meaning candidate acquisition unit 101, the table meaning candidate selection unit 102, the second column table similarity computation unit 103, the table similarity computation unit 104, the table score computation unit 105, and the table meaning identification unit 106), the table meaning recording unit 12, and the end determination unit 13.

Figure 10:
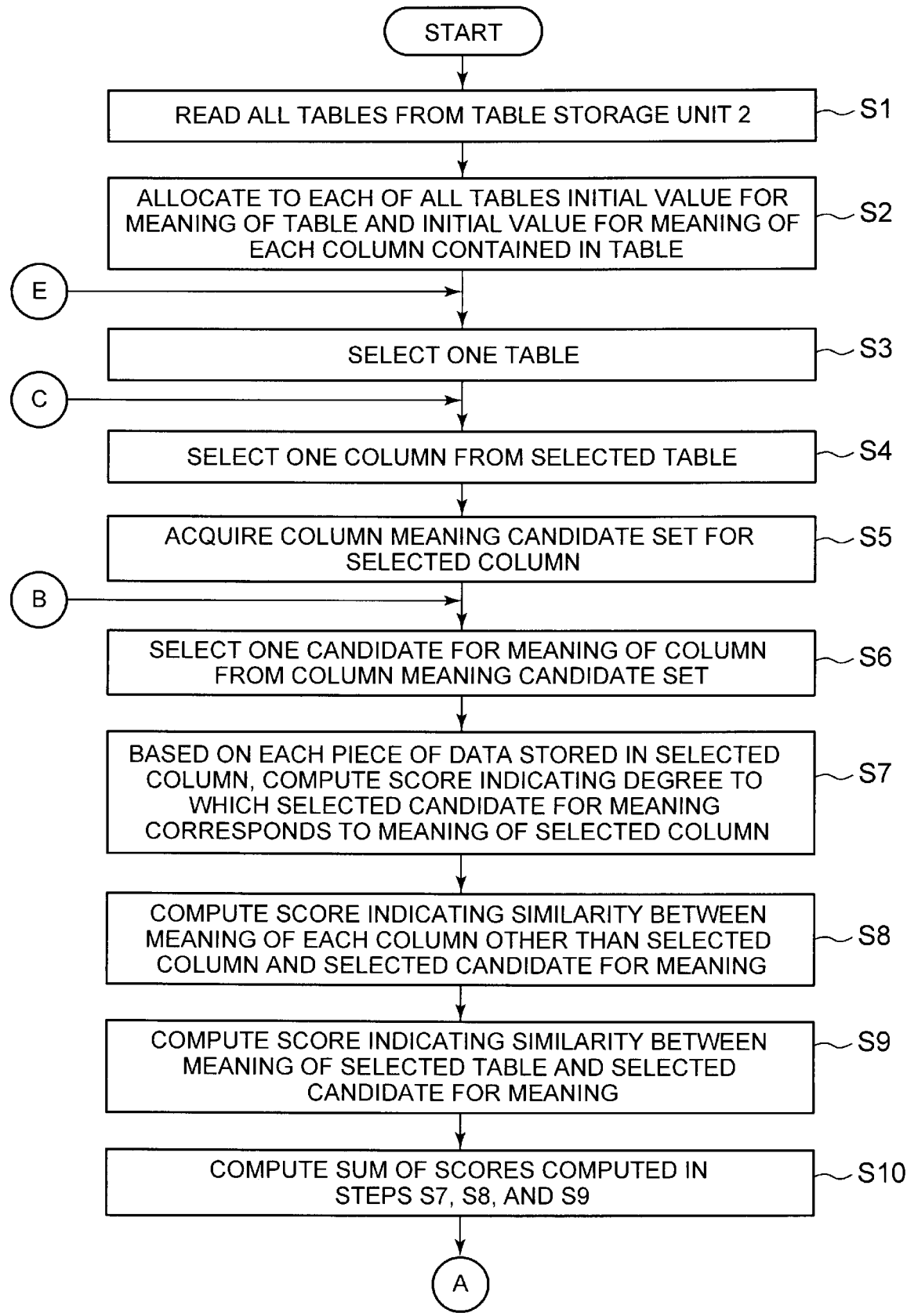
FIG. 10 It depicts a flowchart illustrating an example of a processing procedure of the meaning inference system according to the present invention.
Figure 11:
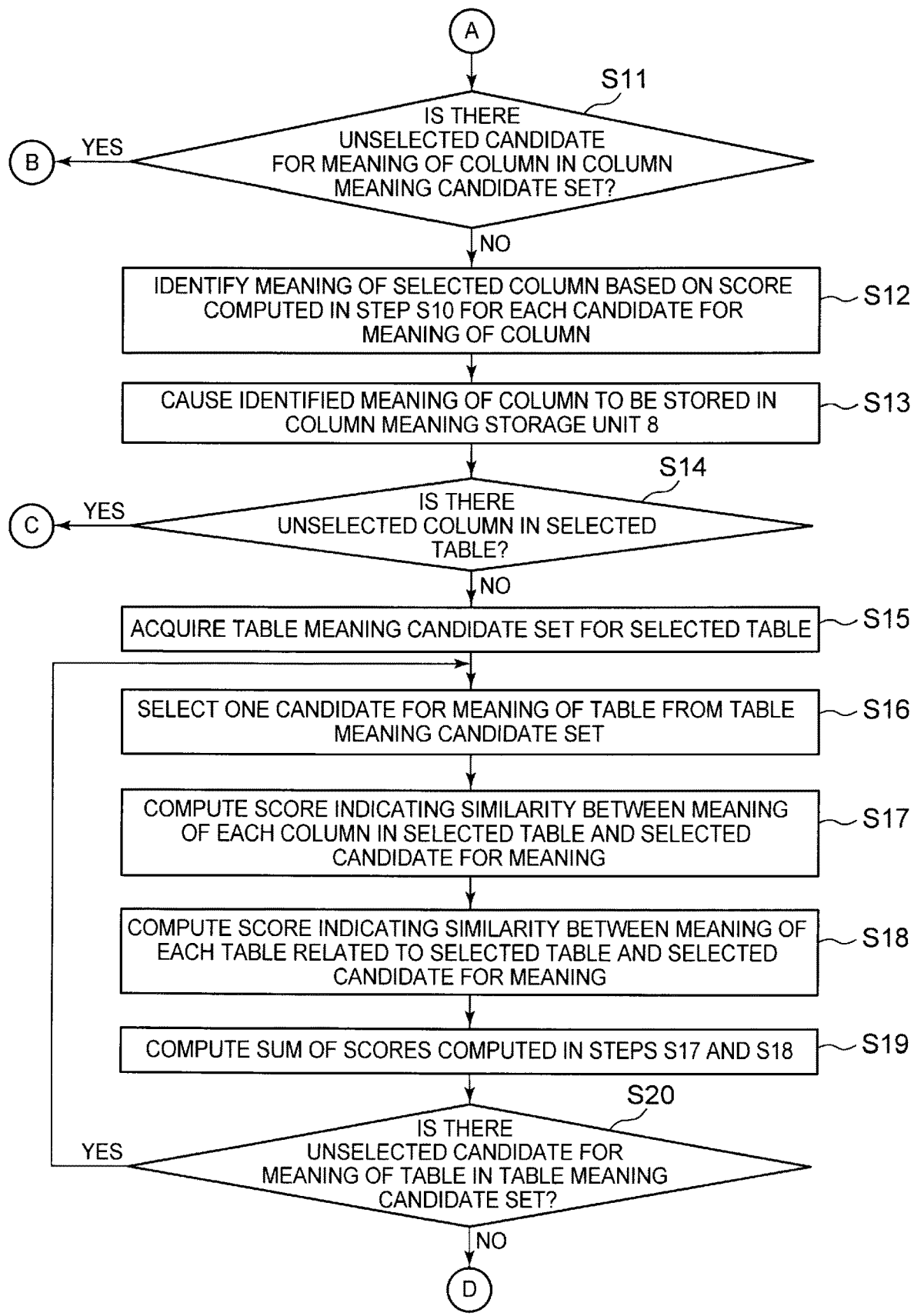
FIG. 11 It depicts a flowchart illustrating the example of the processing procedure of the meaning inference system according to the present invention.
Figures 12, 13:
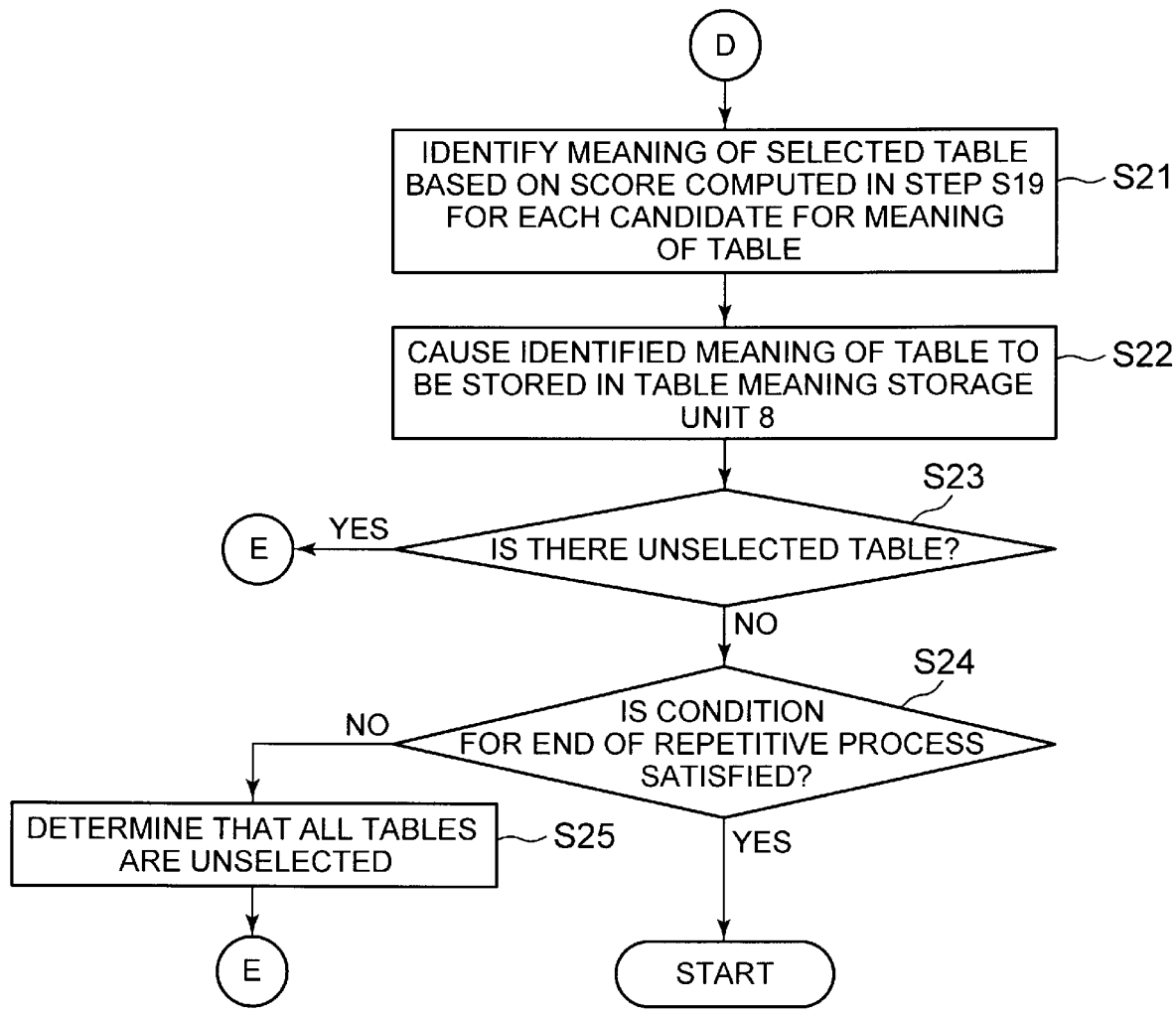
FIG. 12 It depicts a flowchart illustrating the example of the processing procedure of the meaning inference system according to the present invention.
FIG. 13 It depicts a schematic view illustrating an example of a table containing a column whose meaning is to be inferred and a column to which a plurality of meanings are allocated.

Next, a processing procedure according to the first exemplary embodiment will be described. FIGS. 10, 11, and 12 depict flowcharts illustrating an example of a processing procedure of the meaning inference system 1 according to the present invention. Note that description of the matters described above is omitted as needed.

Note that it is assumed that a plurality of tables in each of which the meaning of each column and the meaning of the table are not determined are stored in the table storage unit 2 in advance by the administrator. Similarly, it is assumed that the information indicating which table is related to which table is stored in the table storage unit 2 in advance. Further, it is assumed that the concept dictionary is stored in the meaning set storage unit 4 in advance by the administrator.

First, the data reading unit 3 reads from the table storage unit 2 all tables in each of which the meaning of each column and the meaning of the table are not determined (step S1).

Subsequently, the meaning initial value allocation unit 5 allocates to each of the plurality of tables read by the data reading unit 3 an initial value for meaning of the table and an initial value for meaning of each column contained in the table (step S2). The example of the method for allocating the initial value for meaning of the table and the initial value for meaning of each column has been described, and the description thereof is thus omitted here. The meaning initial value allocation unit 5 causes the initial value for meaning of each column contained in each table to be stored in the column meaning storage unit 8. The meaning initial value allocation unit 5 also causes the initial value for meaning of each table to be stored in the table meaning storage unit 11.

After step S2, the table selection unit 6 selects one unselected table from all the tables (step S3).

Steps S4 to S12 and step S14 are executed by the components (refer to FIG. 3) included in the column meaning inference unit 7.

After step S3, the column selection unit 71 selects one unselected column from the table selected in step S3 (step S4).

Subsequently, the column meaning candidate acquisition unit 72 acquires a plurality of candidates for meaning of the column selected in step S4 from the candidates for meaning stored in the meaning set storage unit 4 (step S5). In other words, the column meaning candidate acquisition unit 72 acquires the column meaning candidate set for the column selected in step S4. The example of the method for acquiring the column meaning candidate set (a plurality of candidates for meaning) has been described, and the description thereof is thus omitted here.

Subsequently, the column meaning candidate selection unit 73 selects one unselected candidate for meaning (candidate for meaning of the column) from the column meaning candidate set (step S6).

Subsequently, based on each piece of data stored in the selected column, the column data score computation unit 74 computes a score indicating the degree to which the candidate for meaning selected in step S6 corresponds to the meaning of the selected column (step S7). The example of the operation in which the column data score computation unit 74 computes the score has been described, and the description thereof is thus omitted here.

Subsequently, the column similarity computation unit 75 computes a score indicating a similarity between the meaning of each column other than the column selected in step S4 in the table selected in step S3 and the candidate for meaning selected in step S6 (step S8). The operation in which the column similarity computation unit 75 computes the score has been described, and the description thereof is thus omitted here.

Subsequently, the first column table similarity computation unit 76 computes a score indicating a similarity between the meaning of the table selected in step S3 and the candidate for meaning selected in step S6 (step S9). The operation in which the first column table similarity computation unit 76 computes the score has been described, and the description thereof is thus omitted here.

Subsequently, for the candidate for meaning selected in step S6, the column score computation unit 77 computes the sum of scores computed in steps S7, S8, and S9 (step S10).

Subsequently, the column meaning candidate selection unit 73 determines whether or not there is an unselected candidate for meaning of the column in the column meaning candidate set (step S11).

In a case in which there is an unselected candidate for meaning of the column (Yes in step S11), the processing in step S6 and the subsequent steps is repeated.

In a case in which there is no unselected candidate for meaning of the column (No in step S11), the processing moves to step S12. In this case, the column score computation unit 77 has computed the score in step S10 for each candidate for meaning of the column. In step S12, the column meaning identification unit 78 identifies the meaning of the selected column based on the score computed in step S10 for each candidate for meaning of the column. In the present example, the column meaning identification unit 78 identifies a candidate for meaning a score of which is maximum as the meaning of the selected column.

Subsequently, the column meaning recording unit 9 (refer to FIG. 1) associates the meaning of the column identified in step S12 with the column and causes the associated meaning to be stored in the column meaning storage unit 8 (step S13).

Subsequently, the column selection unit 71 determines whether or not there is an unselected column in the table selected in step S3 (step S14).

In a case in which there is an unselected column (Yes in step S14), the processing in step S4 and the subsequent steps is repeated.

In a case in which there is no unselected column (No in step S14), the table meaning inference unit 10 performs operations in steps S15 to S21 described below. Steps S15 to S21 described below are executed by the components (refer to FIG. 7) included in the table meaning inference unit 10.

In a case in which there is no unselected column (No in step S14), the table meaning candidate acquisition unit 101 acquires a plurality of candidates for meaning of the table selected in step S3 from the candidates for meaning stored in the meaning set storage unit 4 (step S15). In other words, the table meaning candidate acquisition unit 101 acquires the table meaning candidate set for the table selected in step S3. The example of the method for acquiring the table meaning candidate set (a plurality of candidates for meaning) has been described, and the description thereof is thus omitted here.

Subsequently, the table meaning candidate selection unit 102 selects one unselected candidate for meaning (candidate for meaning of the table) from the table meaning candidate set (step S16).

Subsequently, the second column table similarity computation unit 103 computes a score indicating a similarity between the meaning of each column in the table selected in step S3 and the candidate for meaning selected in step S16 (step S17). The operation in which the second column table similarity computation unit 103 computes the score has been described, and the description thereof is thus omitted here.

Subsequently, the table similarity computation unit 104 computes a score indicating a similarity between the meaning of each table related to the table selected in step S3 and the candidate for meaning selected in step S16 (step S18). The operation in which the table similarity computation unit 104 computes the score has been described, and the description thereof is thus omitted here.

Subsequently, for the candidate for meaning selected in step S16, the table score computation unit 105 computes the sum of scores computed in steps S17 and S18 (step S19).

Subsequently, the table meaning candidate selection unit 102 determines whether or not there is an unselected candidate for meaning of the table in the table meaning candidate set (step S20).

In a case in which there is an unselected candidate for meaning of the table (Yes in step S20), the processing in step S16 and the subsequent steps is repeated.

In a case in which there is no unselected candidate for meaning of the table (No in step S20), the processing moves to step S21. In this case, the table score computation unit 105 has computed the score in step S19 for each candidate for meaning of the table. In step S21, the table meaning identification unit 106 identifies the meaning of the selected table based on the score computed in step S19 for each candidate for meaning of the table. In the present example, the table meaning identification unit 106 identifies a candidate for meaning a score of which is maximum as the meaning of the selected table.

Subsequently, the table meaning recording unit 12 (refer to FIG. 1) associates the meaning of the table identified in step S21 with the table and causes the associated meaning to be stored in the table meaning storage unit 11 (step S22).

Next, the table selection unit 6 determines whether or not there is an unselected table (step S23).

In a case in which there is an unselected table (Yes in step S23), the processing in step S3 and the subsequent steps is repeated.

In a case in which there is no unselected table (No in step S23), the end determination unit 13 determines whether or not a condition for an end of the repetitive process is satisfied (step S24). Specifically, this repetitive process is a process from step S3 to step S25 in a case in which it is determined in step S24 that the end condition is not satisfied. That is, the process from step S3 to step S25 corresponds to one repetitive process. As described above, examples of the end condition include a condition in which the number of repetitions of the repetitive process has reached a predetermined number and a condition in which the meaning of each column contained in each table and the meaning of each table are no longer updated.

In a case in which the ending condition is not satisfied (No in step S24), the table selection unit 6 determines that all the tables are unselected (step S25). At this time, the table selection unit 6 determines that the individual columns in all the tables are unselected. After step S25, the processing in step S3 and the subsequent steps is repeated.

In a case in which the ending condition is satisfied (Yes in step S24), the processing ends.

According to the first exemplary embodiment, the column score computation unit 77 computes in step S10 the score obtained by adding the score (score computed in step S8) indicating a similarity between the candidate for meaning of the selected column in the table (column to be inferred) and the meaning of each of the other columns in the table and the score (score computed in step S9) indicating a similarity between the candidate for meaning and the meaning of the table. The column meaning identification unit 78 then identifies the meaning of the column based on the score computed for each candidate for meaning of the column. Therefore, the meaning of each column in the table can be inferred with high accuracy.

For example, consider a case of inferring the meaning of the third column illustrated in FIGS. 4 and 5. Suppose that the correct meaning of this third column is "age". In a case in which only the score obtained in step S7 is used, "Heisei" may be obtained as the inference result of the meaning of the third column. However, by adding not only the score obtained in step S7 but also the score obtained in step S8 and the score obtained in step S9, the correct inference result "age" can easily be obtained. That is, the accuracy of inferring the meaning of a column can be improved.

Also, according to the first exemplary embodiment, the table score computation unit 105 computes in step S19 the score obtained by adding the score (score computed in step S17) indicating a similarity between the candidate for meaning of the table and the meaning of each column in the table and the score (score computed in step S18) indicating a similarity between the candidate for meaning and the meaning of each table related to the table. The table meaning identification unit 106 then identifies the meaning of the table based on the score computed for each candidate for meaning of the table. Therefore, the meaning of the table can be inferred with high accuracy.

Next, modification examples of the first exemplary embodiment will be described.

In the above description of the processing procedure, the case in which, in step S12, the column meaning identification unit 78 identifies a candidate for meaning a score of which is maximum as the meaning of the selected column has been described as an example. In this case, one meaning is identified for a column whose meaning is to be inferred. As described above, the column meaning identification unit 78 may identify a plurality of meanings of the column to be inferred. In this case, the column meaning recording unit 9 stores the plurality of meanings (meanings of the column) identified in step S12 and the scores computed in step S10 in the column meaning storage unit 8.

Also, in this case, the plurality of meanings are allocated to one column. An example of the score computation method in step S8 in this case will be described. In a case in which the plurality of meanings are allocated to one column, the column similarity computation unit 75 (refer to FIG. 3) may focus only on a meaning with the highest score among the plurality of meanings and compute the score in step S8. FIG. 13 depicts a schematic view illustrating an example of a table containing a column whose meaning is to be inferred and a column to which a plurality of meanings are allocated. To simplify the description, the number of columns is two in FIG. 13. Suppose that two meanings "name" and "prefecture name" are allocated to the first column illustrated in FIG. 13. The numerical values in parentheses are scores corresponding to meanings. Also, the second column illustrated in FIG. 13 is a column whose meaning is to be inferred (column selected in step S4). A candidate for meaning selected for the second column is expressed as sign X. In the example illustrated in FIG. 13, in a case in which the score computation is performed in step S8 by focusing only on a meaning with the highest score, the column similarity computation unit 75 may use only "name" with the highest score to compute sim(X, name). In a case in which there are columns each of which is not a column whose name is to be inferred in addition to the first column, the column similarity computation unit 75 may perform similar computation for each of such columns and derive the sum thereof for use as the computation score in step S8.

Also, in a case of computing the similarity between the column to be inferred and another column, the column similarity computation unit 75 may compute sim( ) for the respective meanings allocated to the other column and weight and add the computation results with use of the scores associated with the meanings. For example, in the case illustrated in FIG. 13, the column similarity computation unit 75 may compute the similarity between the candidate "X" for meaning and the meaning of the first column as follows.

(4.5/(4.5+3.5))×sim(X,name)+(3.5/(4.5×3.5))×sim(X, prefecture name)

In a case in which there are columns each of which is not a column whose name is to be inferred in addition to the first column, the column similarity computation unit 75 may perform similar computation to the above one for each of such columns and derive the sum thereof for use as the computation score in step S8.

Also, an example of the score computation method in step S17 in the case in which the plurality of meanings are allocated to one column will be described. In a case in which the plurality of meanings are allocated to one column, the second column table similarity computation unit 103 (refer to FIG. 7) may focus only on a meaning with the highest score among the plurality of meanings and compute the score in step S17. FIG. 14 depicts a schematic view illustrating a table containing a column to which a plurality of meanings are allocated and a candidate for meaning of the table. To simplify the description, only one column is illustrated in FIG. 14. Further, the candidate for meaning of the table is expressed as sign Z. Suppose that two meanings "name" and "prefecture name" are allocated to the column illustrated in FIG. 14. The numerical values in parentheses are scores corresponding to meanings. In the example illustrated in FIG. 14, in a case in which the score computation is performed in step S17 by focusing only on a meaning with the highest score, the second column table similarity computation unit 103 may use only "name" with the highest score to compute sim(Z, name). The second column table similarity computation unit 103 may perform similar computation for each of the other columns (not illustrated in FIG. 14) and derive the sum thereof for use as the computation score in step S17.

Also, in a case of computing the similarity between the meaning of one column and a candidate for meaning of the table, the second column table similarity computation unit 103 may compute sim ( ) for the respective meanings allocated to the column and weight and add the computation results with use of the scores associated with the meanings. For example, the similarity between the candidate "Z" for meaning of the table and the meaning of one column illustrated in FIG. 14 may be computed as follows.

(4.5/(4.5+3.5))×sim(Z,name)+(3.5/(4.5+3.5))×sim(Z, prefecture name)

The second column table similarity computation unit 103 may perform similar computation for each of the other columns (not illustrated in FIG. 14) and derive the sum thereof for use as the computation score in step S17.

Also, in the above description of the processing procedure, the case in which, in step S21, the table meaning identification unit 106 identifies a candidate for meaning a score of which is maximum as the meaning of the selected table has been described as an example. In this case, one meaning is identified for a selected table. As described above, the table meaning identification unit 106 may identify a plurality of meanings of a table. In this case, the table meaning recording unit 12 stores the plurality of meanings (meanings of the table) identified in step S21 and the scores computed in step S19 in the table meaning storage unit 11.

Also, in this case, the plurality of meanings are allocated to one table. An example of the score computation method in step S9 in this case will be described. In a case in which the plurality of meanings are allocated to one table, the first column table similarity computation unit 76 (refer to FIG. 3) may focus only on a meaning with the highest score among the plurality of meanings and compute the score in step S9. FIG. 15 depicts a schematic view illustrating examples of a column whose meaning is to be inferred and a plurality of meanings allocated to a table. To simplify the description, in FIG. 15, columns other than the column whose meaning is to be inferred are omitted. A selected candidate for meaning (candidate for meaning of the column) is expressed as sign X. Also, suppose that two meanings "researcher" and "customer" are allocated to the table. The numerical values in parentheses are scores corresponding to meanings. In the example illustrated in FIG. 15, in a case in which the score computation is performed in step S9 by focusing only on a meaning with the highest score, the first column table similarity computation unit 76 may use only "researcher" with the highest score to compute sim (X, researcher). The first column table similarity computation unit 76 may use the computation result as the computation score in step S9.

Also, in a case of computing the score in step S9, the first column table similarity computation unit 76 may compute sim ( ) for the respective meanings allocated to the table and weight and add the computation results with use of the scores associated with the meanings. For example, in the case illustrated in FIG. 15, the first column table similarity computation unit 76 may compute the similarity between the candidate "X" for meaning and the meaning of the table as follows.

(4.5/(4.5+3.5))×sim(X,researcher)+(3.5/(4.5+3.5))×sim(X,customer)

The first column table similarity computation unit 76 may use the above computation result as the computation score in step S9.

Also, an example of the score computation method in step S18 in the case in which the plurality of meanings are allocated to one table will be described. In a case in which the plurality of meanings are allocated to one table, the table similarity computation unit 104 (refer to FIG. 7) may focus only on a meaning with the highest score among the plurality of meanings and compute the score in step S18. FIG. 16 depicts a schematic view illustrating examples of a table whose meaning is to be inferred and another table related to the table. The table 51 illustrated in FIG. 16 is a table whose meaning is to be inferred. A selected candidate for meaning of the table 51 is expressed as sign Z. The table 52 is a table related to the table 51. Also, suppose that two meanings "customer" and "researcher" are allocated to the table 52. The numerical values in parentheses are scores corresponding to meanings. In the example illustrated in FIG. 16, in a case in which the score computation is performed in step S18 by focusing only on a meaning with the highest score, the table similarity computation unit 104 may use only "customer" with the highest score to compute sim(Z, customer). The table similarity computation unit 104 may perform similar computation for each of the other columns related to the table 51 and derive the sum thereof for use as the computation score in step S18.

Also, in a case of computing the similarity between a candidate for meaning of a table and the meaning of another table related to the table, the table similarity computation unit 104 may compute sim ( ) for the respective meanings allocated to the other table and weight and add the computation results with use of the scores associated with the meanings. For example, in the case illustrated in FIG. 16, the table similarity computation unit 104 may compute the similarity between the candidate "Z" for meaning and the meaning of the table 52 as follows.

(4.5/(4.5+3.5))×sim(Z,customer)+(3.5/(4.5+3.5))×sim(Z,researcher)

The table similarity computation unit 104 may perform similar computation to the above one for each of the tables related to the table 51 and derive the sum thereof for use as the computation score in step S18.

Second Exemplary Embodiment

Figure 17:
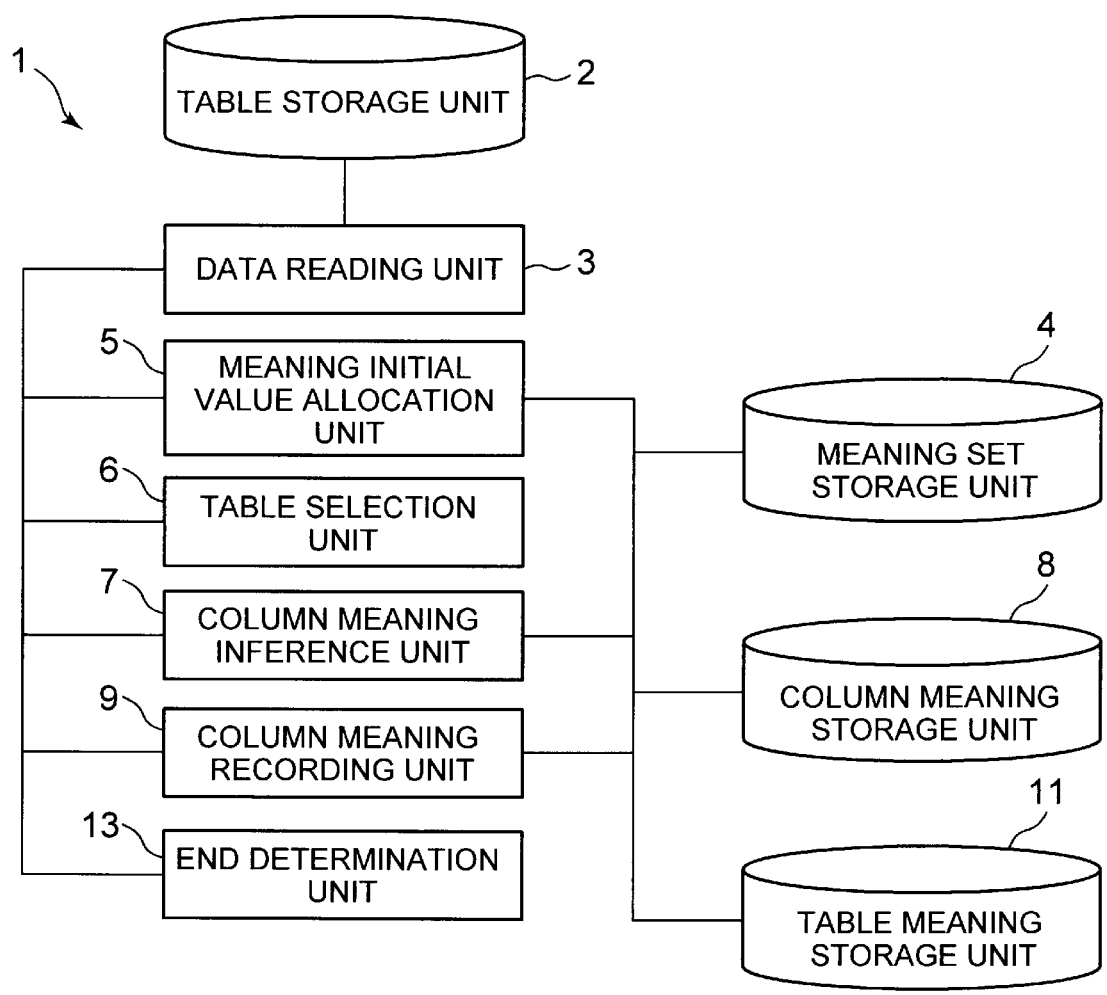
FIG. 17 It depicts a block diagram illustrating a configuration example of a meaning inference system according to a second exemplary embodiment of the present invention.

In a second exemplary embodiment, a meaning inference system according to the present invention infers the meaning of each column in a table and does not infer the meaning of the table. FIG. 17 depicts a block diagram illustrating a configuration example of a meaning inference system according to a second exemplary embodiment of the present invention. Similar components to those in FIG. 1 are labeled with the same reference signs as those in FIG. 1, and description thereof is omitted. The configuration is similar to that illustrated in FIG. 1 except that the table meaning inference unit 10 and the table meaning recording unit 12 are not provided. In the second exemplary embodiment, the meaning inference system 1 does not include the table meaning inference unit 10 and thus does not infer the meaning of a table.

In the second exemplary embodiment, information indicating which table is related to which table may not be given.

In the second exemplary embodiment, the meaning inference system 1 does not execute the aforementioned processing in steps S15 to S22. That is, in a case in which it is determined in step S14 by the column selection unit 71 that there is no unselected column (No in step S14), the processing moves to step S23, and the table selection unit 6 may determine whether or not there is an unselected table. The processing procedure is similar to that described in the first exemplary embodiment in the other respects.

Note that the meaning of a table stored in advance in the table storage unit 2 does not have to be determined. Even in this case, since the meaning initial value allocation unit 5 allocates an initial value for meaning of the table, the first column table similarity computation unit 76 (refer to FIG. 3) can perform the score computation in step S9. Note that, in a case in which the meaning of the table is not determined, the score computation processing in step S9 may be omitted. A configuration example of the column meaning inference unit 7 that omits the score computation processing in step S9 will be described below.

Also, the meaning of a table stored in advance in the table storage unit 2 may be determined. In this case, the meaning initial value allocation unit 5 may allocate the meaning of the table determined in advance as an initial value for meaning of the table.

Note that, in the second exemplary embodiment, the meaning of the table is not updated from the initial value.

According to the second exemplary embodiment as well, the column score computation unit 77 computes in step S10 the score obtained by adding the score (score computed in step S8) indicating a similarity between the candidate for meaning of the selected column in the table (column to be inferred) and the meaning of each of the other columns in the table and the score (score computed in step S9) indicating a similarity between the candidate for meaning and the meaning of the table. The column meaning identification unit 78 then identifies the meaning of the column based on the score computed for each candidate for meaning of the column. Therefore, the meaning of each column in the table can be inferred with high accuracy.

Note that the modification examples described in the first exemplary embodiment may be applied to the second exemplary embodiment.

Third Exemplary Embodiment

Figure 18:
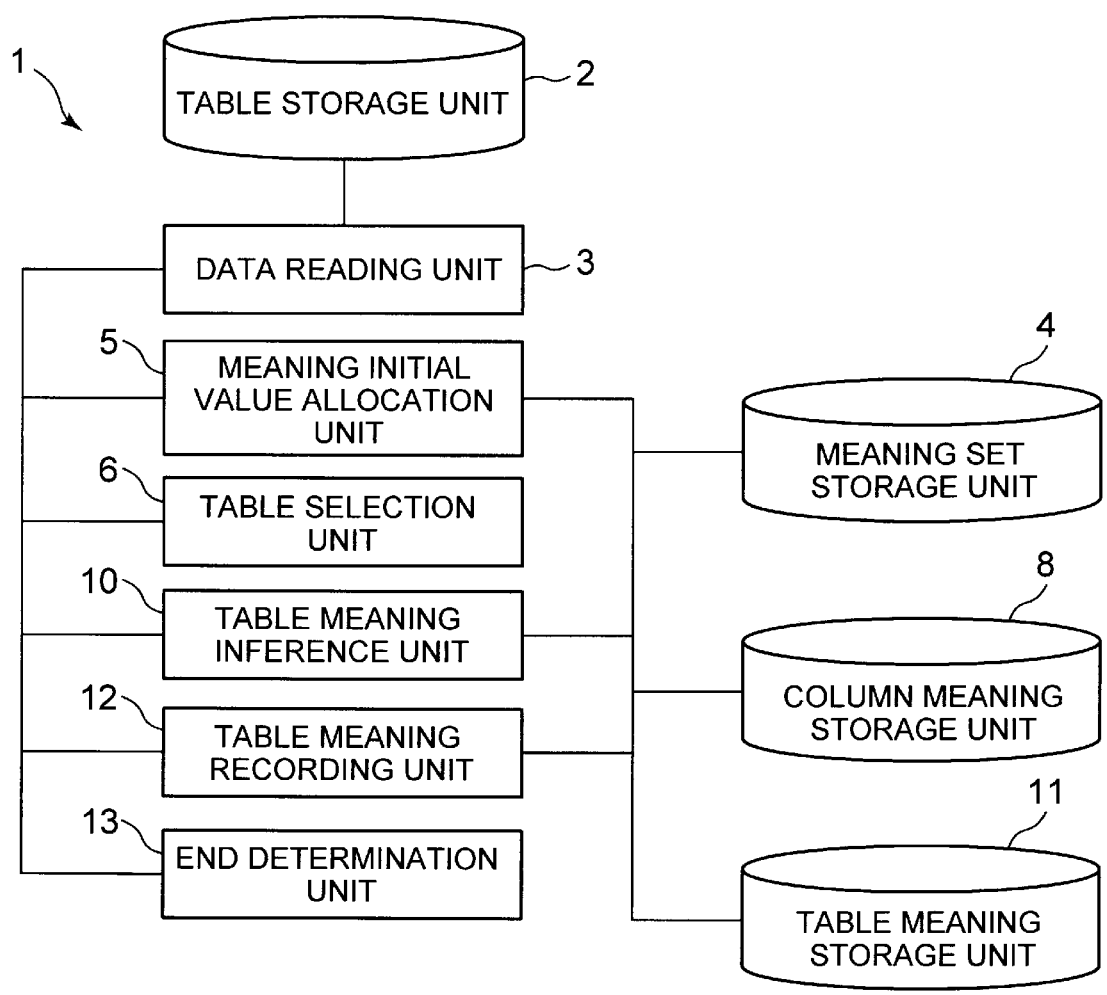
FIG. 18 It depicts a block diagram illustrating a configuration example of a meaning inference system according to a third exemplary embodiment of the present invention.

In a third exemplary embodiment, a meaning inference system according to the present invention infers the meaning of a table and does not infer the meaning of each column in the table. FIG. 18 depicts a block diagram illustrating a configuration example of a meaning inference system according to a third exemplary embodiment of the present invention. Similar components to those in FIG. 1 are labeled with the same reference signs as those in FIG. 1, and description thereof is omitted. The configuration is similar to that illustrated in FIG. 1 except that the column meaning inference unit 7 and the column meaning recording unit 9 are not provided. In the third exemplary embodiment, the meaning inference system 1 does not include the column meaning inference unit 7 and thus does not infer the meaning of each column in a table.

In the third exemplary embodiment, the meaning inference system 1 does not execute the aforementioned processing in steps S4 to S14. That is, after the table selection unit 6 selects one table in step S3, the processing moves to step S15, and the table meaning candidate acquisition unit 101 may acquire a table meaning candidate set for the selected table. The processing procedure is similar to that described in the first exemplary embodiment in the other respects.

Note that the meaning of each column in each table stored in advance in the table storage unit 2 does not have to be determined. Even in this case, since the meaning initial value allocation unit 5 allocates an initial value for meaning of each column in each table, the second column table similarity computation unit 103 (refer to FIG. 7) can perform the score computation processing in step S17. Note that, in a case in which the meaning of each column in each table is not determined, the score computation processing in step S17 may be omitted. A configuration example of the table meaning inference unit 10 that omits the score computation processing in step S17 will be described below.

Also, the meaning of each column in each table stored in advance in the table storage unit 2 may be determined. In this case, the meaning initial value allocation unit 5 may allocate the meaning of each column in each table determined in advance as an initial value for meaning of the column.

Note that, in the third exemplary embodiment, the meaning of each column in each table is not updated from the initial value.

According to the third exemplary embodiment as well, the table score computation unit 105 computes in step S19 the score obtained by adding the score (score computed in step S17) indicating a similarity between the candidate for meaning of the table and the meaning of each column in the table and the score (score computed in step S18) indicating a similarity between the candidate for meaning and the meaning of each table related to the table. The table meaning identification unit 106 then identifies the meaning of the table based on the score computed for each candidate for meaning of the table. Therefore, the meaning of the table can be inferred with high accuracy.

Note that the modification examples described in the first exemplary embodiment may be applied to the third exemplary embodiment.

Next, modification examples of the various aforementioned exemplary embodiments will be described.

Figure 19:
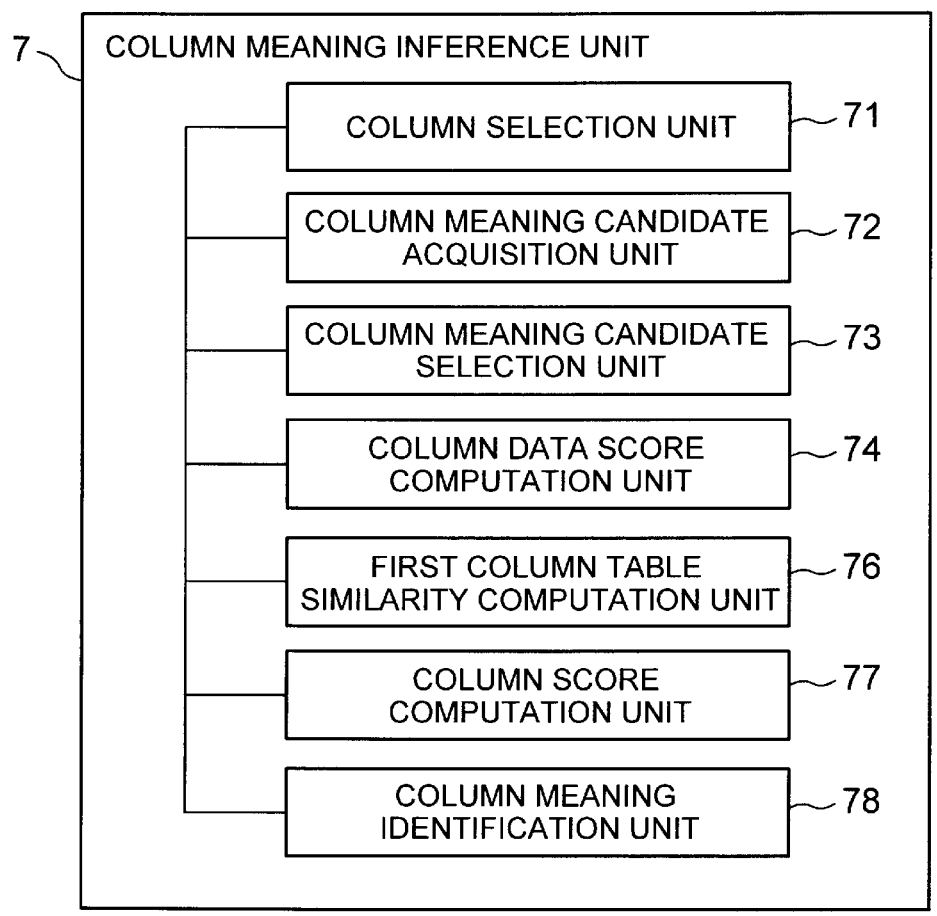
FIG. 19 It depicts a block diagram illustrating a modification example of the column meaning inference unit.

In the first exemplary embodiment and the second exemplary embodiment, the column meaning inference unit 7 may omit the score computation processing in step S8 described in the first exemplary embodiment. FIG. 19 depicts a block diagram illustrating a configuration example of the column meaning inference unit 7 in this case. Similar components to those in FIG. 3 are labeled with the same reference signs as those in FIG. 3, and description thereof is omitted. The configuration is similar to that illustrated in FIG. 3 except that the column similarity computation unit 75 is not provided. In the present modification example, since the column meaning inference unit 7 does not include the column similarity computation unit 75, the score computation processing in step S8 is not performed.

Also, since the score computation processing in step S8 is not performed, the column score computation unit 77 illustrated in FIG. 19 computes in step S10 (refer to FIG. 10) the sum of the scores computed in steps S7 and S9.

The other respects are similar to those in the first exemplary embodiment or the second exemplary embodiment. In the present modification example, the column score computation unit 77 computes in step S10 the score obtained by adding the score (score computed in step S9) indicating a similarity between a candidate for meaning of a column whose meaning is to be inferred and the meaning of the table. The column meaning identification unit 78 then identifies the meaning of the column based on the score computed for each candidate for meaning of the column. Therefore, the meaning of each column in the table can be inferred with high accuracy.

Figure 20:
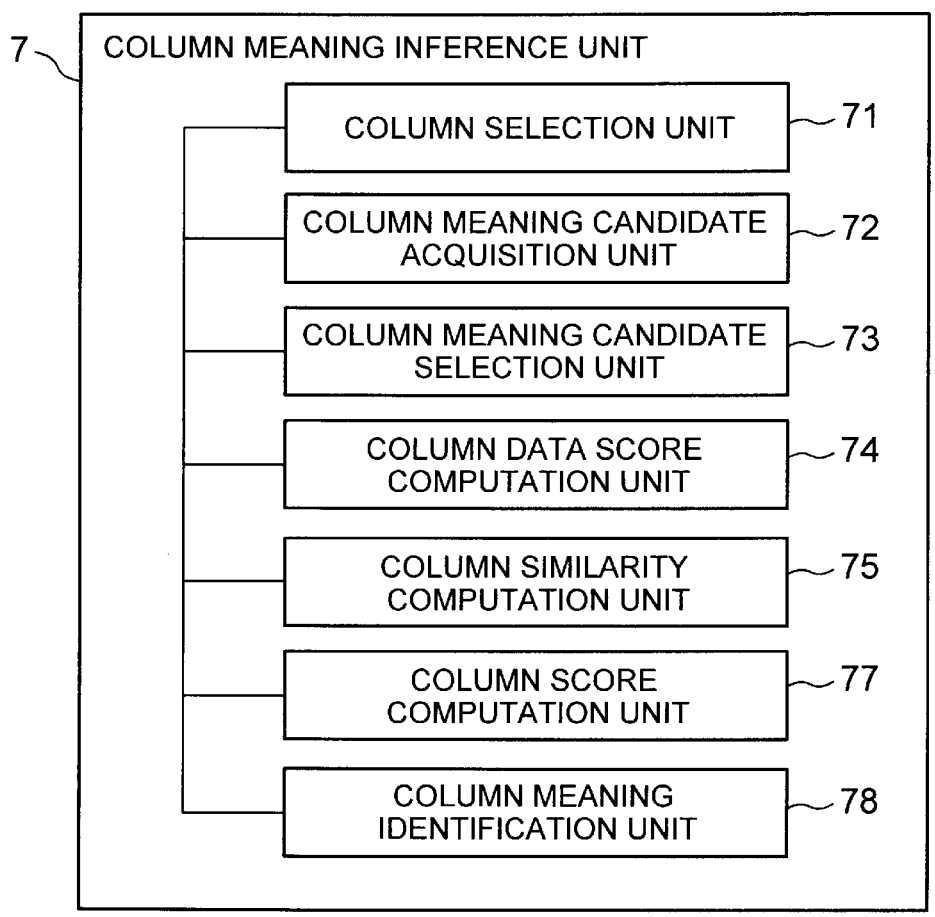
FIG. 20 It depicts a block diagram illustrating a modification example of the column meaning inference unit.

Also, in the first exemplary embodiment and the second exemplary embodiment, the column meaning inference unit 7 may omit the score computation processing in step 9 described in the first exemplary embodiment. FIG. 20 depicts a block diagram illustrating a configuration example of the column meaning inference unit 7 in this case. Similar components to those in FIG. 3 are labeled with the same reference signs as those in FIG. 3, and description thereof is omitted. The configuration is similar to that illustrated in FIG. 3 except that the first column table similarity computation unit 76 is not provided. In the present modification example, since the column meaning inference unit 7 does not include the first column table similarity computation unit 76, the score computation processing in step S9 is not performed.

Also, since the score computation processing in step S9 is not performed, the column score computation unit 77 illustrated in FIG. 20 computes in step S10 (refer to FIG. 10) the sum of the scores computed in steps S7 and S8.

The other respects are similar to those in the first exemplary embodiment or the second exemplary embodiment. In the present modification example, the column score computation unit 77 computes in step S10 the score obtained by adding the score (score computed in step S8) indicating a similarity between a candidate for meaning of a column whose meaning is to be inferred and the meaning of each of the other columns in the table. The column meaning identification unit 78 then identifies the meaning of the column based on the score computed for each candidate for meaning of the column. Therefore, the meaning of each column in the table can be inferred with high accuracy.

Figure 21:
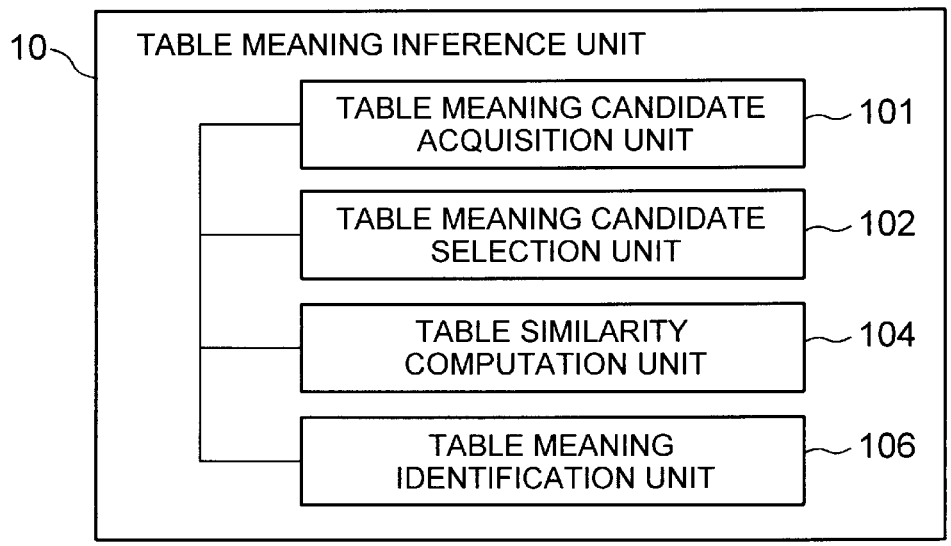
FIG. 21 It depicts a block diagram illustrating a modification example of the table meaning inference unit.

Also, in the first exemplary embodiment and the third exemplary embodiment, the table meaning inference unit 10 may omit the score computation processing in step S17 described in the first exemplary embodiment. Note that, in a case in which the score computation processing in step S17 is omitted, the processing in step S19 may also be omitted. FIG. 21 depicts a block diagram illustrating a configuration example of the table meaning inference unit 10 in this case. Similar components to those in FIG. 7 are labeled with the same reference signs as those in FIG. 7, and description thereof is omitted. The configuration is similar to that illustrated in FIG. 7 except that the second column table similarity computation unit 103 and the table score computation unit 105 are not provided. In the present modification example, since the table meaning inference unit 10 does not include the second column table similarity computation unit 103 and the table score computation unit 105, the score computation processing in step S17 and the score computation processing in step S19 are not performed.

In the present modification example, in step S21 (refer to FIG. 12), the table meaning identification unit 106 identifies the meaning of the selected table based on the score computed in step S18. This respect differs from step S21 in the first exemplary embodiment or the third exemplary embodiment.

The other respects are similar to those in the first exemplary embodiment or the third exemplary embodiment. In the present modification example, the table meaning identification unit 106 identifies the meaning of the table based on the score (score computed in step S18) indicating a similarity between a candidate for meaning of the table and the meaning of each table related to the table. Therefore, the meaning of the table can be inferred with high accuracy.

Figure 22:
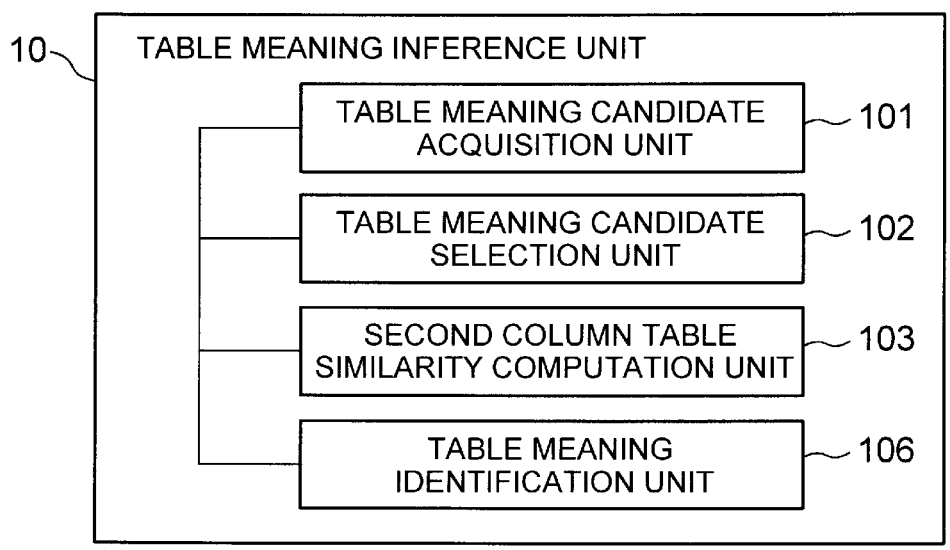
FIG. 22 It depicts a block diagram illustrating a modification example of the table meaning inference unit.

Also, in the first exemplary embodiment and the third exemplary embodiment, the table meaning inference unit 10 may omit the score computation processing in step S18 described in the first exemplary embodiment. Note that, in a case in which the score computation processing in step S18 is omitted, the processing in step S19 may also be omitted. FIG. 22 depicts a block diagram illustrating a configuration example of the table meaning inference unit 10 in this case. Similar components to those in FIG. 7 are labeled with the same reference signs as those in FIG. 7, and description thereof is omitted. The configuration is similar to that illustrated in FIG. 7 except that the table similarity computation unit 104 and the table score computation unit 105 are not provided. In the present modification example, since the table meaning inference unit 10 does not include the table similarity computation unit 104 and the table score computation unit 105, the score computation processing in step S18 and the score computation processing in step S19 are not performed.

In the present modification example, information indicating which table is related to which table may not be given. Also, in the present modification example, in step S21 (refer to FIG. 12), the table meaning identification unit 106 identifies the meaning of the selected table based on the score computed in step S17. This respect differs from step S21 in the first exemplary embodiment or the third exemplary embodiment.

The other respects are similar to those in the first exemplary embodiment or the third exemplary embodiment. In the present modification example, the table meaning identification unit 106 identifies the meaning of the table based on the score (score computed in step S17) indicating a similarity between a candidate for meaning of the table and the meaning of each column in the table. Therefore, the meaning of the table can be inferred with high accuracy.

Also, in the description of each of the aforementioned exemplary embodiments and the modifications thereof, the number of hops in the concept dictionary is used at the time of deriving a similarity between a selected candidate for meaning and another meaning. More specifically, in the description, the similarity between the selected candidate for meaning and the other meaning is computed as a reciprocal of the number of hops between these in the concept dictionary.

In each of the aforementioned exemplary embodiments and the modifications thereof, a vector for computing a value corresponding to the number of hops in the concept dictionary may previously be allocated to each candidate for meaning of a table and each candidate for meaning of a table, and a combination of the candidate for meaning and the vector may be stored in the meaning set storage unit 4 for each candidate for meaning instead of using the concept dictionary. This vector is called an embedding vector. RESCAL is known as an algorithm for deriving an embedding vector of each node in a concept dictionary based on the given concept dictionary. An embedding vector may be derived in advance for each candidate (candidate for meaning) by RESCAL, and a combination of the candidate for meaning and the embedding vector may be stored in the meaning set storage unit 4 for each candidate for meaning. In this case, sim(X, Y) (where X and Y are arbitrary meanings) can be derived even in a case in which no concept dictionary is stored in the meaning set storage unit 4. An inner product between an embedding vector associated with X and an embedding vector associated with Y is a value corresponding to the number of hops between X and Y in the concept dictionary. Therefore, the combination of the candidate for meaning and the embedding vector may be stored in the meaning set storage unit 4 for each candidate for meaning, and in a case in which sim(X, Y) is to be derived for arbitrary X and Y, a reciprocal of the inner product between the embedding vector associated with X and the embedding vector associated with Y may be derived. In this manner, the similarity can be computed without directly deriving the number of hops. Also, word2vec is known as an algorithm for deriving an embedding vector associated with each candidate for meaning. In word2vec, the embedding vector can be derived from various existing documents even with no concept dictionary.

Figure 23:
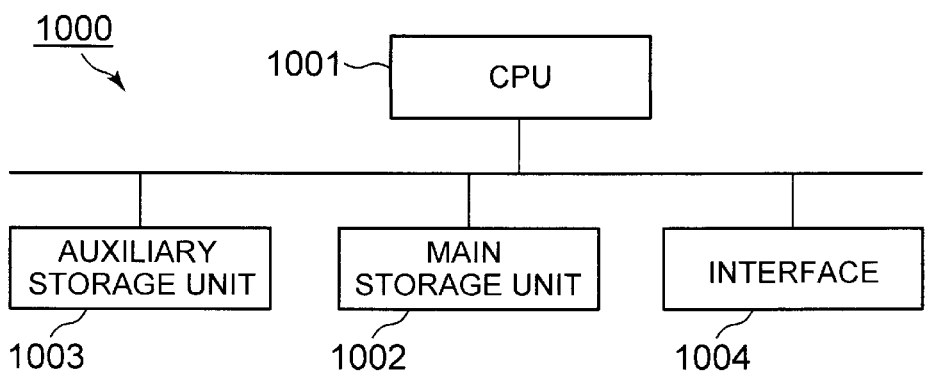
FIG. 23 It depicts a schematic block diagram illustrating a configuration example of a computer according to each of the exemplary embodiments of the present invention.

FIG. 23 depicts a schematic block diagram illustrating a configuration example of a computer according to each of the exemplary embodiments of the present invention. A computer 1000 includes a CPU 1001, a main storage unit 1002, an auxiliary storage unit 1003, and an interface 1004.

The meaning inference system 1 according to each of the exemplary embodiments of the present invention is implemented in the computer 1000. The operation of the meaning inference system 1 is stored in the auxiliary storage unit 1003 in a form of a meaning inference program. The CPU 1001 reads out the meaning inference program from the auxiliary storage unit 1003, expands the program on the main storage unit 1002, and executes the processing described in each of the aforementioned exemplary embodiments and the modification examples in accordance with the meaning inference program.

The auxiliary storage unit 1003 is an example of a not-temporary tangible medium. Other examples of the not-temporary tangible medium are a magnetic disk, a magneto-optical disk, a compact disk read only memory (CD-ROM), a digital versatile disk read only memory (DVD-ROM), and a semiconductor memory connected via the interface 1004. Also, in a case in which the program is delivered to the computer 1000 via communication lines, the computer 1000 may receive the program, expand the program on the main storage unit 1002, and execute the above processing.

Also, the program may execute part of the above processing. Further, the program may be a difference program executing the above processing as a result of combination with another program prestored in the auxiliary storage unit 1003.

Also, a part or all of each component may be executed by general-purpose or dedicated circuitry, processor, or the like, or a combination thereof. The circuitry, processor, or the like, or the combination thereof may include a single chip or a plurality of chips connected via a bus. Also, a part or all of each component may be executed by a combination of the aforementioned circuitry or the like and a program.

In a case in which a part or all of each component is executed by a plurality of information processing devices, circuits, and the like, the plurality of information processing devices, circuits, and the like may be provided in a focused or distributed manner. For example, the information processing devices, circuits, and the like may be executed in a manner in which the respective units are connected via a communication network, such as a client-and-server system and a cloud computing system.

Next, an overview of the present invention will be described. FIG. 24 depicts a block diagram illustrating an overview of a meaning inference system according to the present invention. The meaning inference system according to the present invention includes a column meaning candidate selection means 303, a column similarity computation means 304, and a column meaning identification means 305.

The column meaning candidate selection means 303 (for example, the column meaning candidate selection unit 73) selects a candidate for meaning of a column whose meaning is to be inferred.

The column similarity computation means 304 (for example, the column similarity computation unit 75) computes, for each candidate for meaning selected by the column meaning candidate selection means 303, a score indicating a similarity between the selected candidate for meaning and meaning of each column other than the column whose meaning is to be inferred contained in a table.

The column meaning identification means 305 (for example, the column meaning identification unit 78) identifies meaning of the column whose meaning is to be inferred from the candidates for meaning of the column with use of the score computed by the column similarity computation means 304.

According to such a configuration, the meaning of each column in a table can be inferred with high accuracy.

FIG. 25 depicts a block diagram illustrating another example of an overview of a meaning inference system according to the present invention. The meaning inference system illustrated in FIG. 25 includes a column meaning candidate selection means 403, a first column table similarity computation means 404, and a column meaning identification means 405.

The column meaning candidate selection means 403 (for example, the column meaning candidate selection unit 73) selects a candidate for meaning of a column whose meaning is to be inferred.

The first column table similarity computation means 404 (for example, the first column table similarity computation unit 76) computes, for each candidate for meaning selected by the column meaning candidate selection means, a score indicating a similarity between a selected candidate for meaning and meaning of a table.

The column meaning identification means 405 (for example, the column meaning identification unit 78) identifies meaning of the column whose meaning is to be inferred from the candidates for meaning of the column with use of the score computed by the first column table similarity computation means 404.

According to such a configuration, the meaning of each column in a table can be inferred with high accuracy.

The above exemplary embodiments of the present invention can be described as, but are not limited to, the following supplementary notes.

(Supplementary Note 1)

A meaning inference system inferring meaning of a column contained in a table, including:
  a column meaning candidate selection means selecting at least one candidate for meaning of a column whose meaning is to be inferred;
  a column similarity computation means computing, for each candidate for meaning selected by the column meaning candidate selection means, a score indicating a similarity between the selected candidate for meaning and meaning of each column other than the column whose meaning is to be inferred contained in a table; and
  a column meaning identification means identifying meaning of the column whose meaning is to be inferred from the candidates for meaning of the column with use of the score computed by the column similarity computation means.

(Supplementary Note 2)

The meaning inference system according to supplementary note 1, including:
  a meaning initial value allocation means allocating an initial value for meaning of each column in the table; and
  a column selection means selecting the column whose meaning is to be inferred.

(Supplementary Note 3)

The meaning inference system according to supplementary note 2, in which the meaning initial value allocation means allocates an initial value for meaning of the table, the meaning inference system including:
  a first column table similarity computation means computing, for each candidate for meaning selected by the column meaning candidate selection means, a score indicating a similarity between the selected candidate for meaning and the meaning of the table,
  in which the column meaning identification means identifies the meaning of the column whose meaning is to be inferred with use of the score computed by the column similarity computation means and the score computed by the first column table similarity computation means.

(Supplementary Note 4)

The meaning inference system according to supplementary note 2, in which the meaning initial value allocation means allocates to each of a plurality of given tables an initial value for meaning of each column contained in the table, the meaning inference system including:
  a table selection means selecting a table from the plurality of given tables,
  in which, until a predetermined condition is satisfied, a process is repeated in which the table selection means selects a table from the plurality of given tables, in which the column selection means selects a column whose meaning is to be inferred from the table selected by the table selection means, and in which the column meaning identification means identifies meaning of each column in the selected table.

(Supplementary Note 5)

The meaning inference system according to supplementary note 3, in which the meaning initial value allocation means allocates to each of a plurality of given tables an initial value for meaning of the table and an initial value for meaning of each column contained in the table, the meaning inference system including:
  a table selection means selecting a table from the plurality of given tables,
  in which, until a predetermined condition is satisfied, a process is repeated in which the table selection means selects a table from the plurality of given tables, in which the column selection means selects a column whose meaning is to be inferred from the table selected by the table selection means, and in which the column meaning identification means identifies meaning of each column in the selected table.

(Supplementary Note 6)

A meaning inference system inferring meaning of a column contained in a table, including:
  a column meaning candidate selection means selecting at least one candidate for meaning of a column whose meaning is to be inferred;
  a first column table similarity computation means computing, for each candidate for meaning selected by the column meaning candidate selection means, a score indicating a similarity between the selected candidate for meaning and meaning of a table; and
  a column meaning identification means identifying meaning of the column whose meaning is to be inferred from the candidates for meaning of the column with use of the score computed by the first column table similarity computation means.

(Supplementary Note 7)

The meaning inference system according to supplementary note 6, including:
  a meaning initial value allocation means allocating an initial value for meaning of the table and an initial value for meaning of each column in the table; and
  a column selection means selecting the column whose meaning is to be inferred.

(Supplementary Note 8)

The meaning inference system according to supplementary note 7, in which the meaning initial value allocation means allocates to each of a plurality of given tables an initial value for meaning of the table and an initial value for meaning of each column contained in the table, the meaning inference system including:
  a table selection means selecting a table from the plurality of given tables,
  in which, until a predetermined condition is satisfied, a process is repeated in which the table selection means selects a table from the plurality of given tables, in which the column selection means selects a column whose meaning is to be inferred from the table selected by the table selection means, and in which the column meaning identification means identifies meaning of each column in the selected table.

(Supplementary Note 9)

The meaning inference system according to any one of supplementary notes 2, 3, and 7, in which the meaning initial value allocation means allocates to each of a plurality of given tables an initial value for meaning of the table and an initial value for meaning of each column contained in the table, the meaning inference system including:
  a table selection means selecting a table whose meaning is to be inferred from the plurality of given tables;
  a table meaning candidate selection means selecting at least one candidate for meaning of the table whose meaning is to be inferred;
  a table similarity computation means computing, for each candidate for meaning selected by the table meaning candidate selection means, a score indicating a similarity between the selected candidate for meaning and meaning of each table, other than the table whose meaning is to be inferred, related to the table whose meaning is to be inferred; and a table meaning identification means identifying meaning of the table whose meaning is to be inferred from the candidates for meaning of the table with use of the score computed by the table similarity computation means.

(Supplementary Note 10)

The meaning inference system according to any one of supplementary notes 2, 3, and 7, in which the meaning initial value allocation means allocates to each of a plurality of given tables an initial value for meaning of the table and an initial value for meaning of each column contained in the table, the meaning inference system including:

a table selection means selecting a table whose meaning is to be inferred from the plurality of given tables;

a table meaning candidate selection means selecting at least one candidate for meaning of the table whose meaning is to be inferred;

a second column table similarity computation means computing, for each candidate for meaning selected by the table meaning candidate selection means, a score indicating a similarity between the selected candidate for meaning and meaning of each column in the table whose meaning is to be inferred; and a table meaning identification means identifying meaning of the table whose meaning is to be inferred from the candidates for meaning of the table with use of the score computed by the second column table similarity computation means.

(Supplementary Note 11)

The meaning inference system according to any one of supplementary notes 2, 3, and 7, in which the meaning initial value allocation means allocates to each of a plurality of given tables an initial value for meaning of the table and an initial value for meaning of each column contained in the table, the meaning inference system including:

a table selection means selecting a table whose meaning is to be inferred from the plurality of given tables;

a table meaning candidate selection means selecting at least one candidate for meaning of the table whose meaning is to be inferred;

a table similarity computation means computing, for each candidate for meaning selected by the table meaning candidate selection means, a score indicating a similarity between the selected candidate for meaning and meaning of each table, other than the table whose meaning is to be inferred, related to the table whose meaning is to be inferred;

a second column table similarity computation means computing, for each candidate for meaning selected by the table meaning candidate selection means, a score indicating a similarity between the selected candidate for meaning and meaning of each column in the table whose meaning is to be inferred; and a table meaning identification means identifying meaning of the table whose meaning is to be inferred from the candidates for meaning of the table with use of the score computed by the table similarity computation means and the score computed by the second column table similarity computation means.

(Supplementary Note 12)

The meaning inference system according to any one of supplementary notes 9 to 11, in which, until a predetermined condition is satisfied, a process is repeated in which the table selection means selects a table from the plurality of given tables, in which the column selection means selects a column whose meaning is to be inferred from the table selected by the table selection means, in which the column meaning identification means identifies meaning of each column in the selected table, and in which the table meaning identification means identifies meaning of each table.

(Supplementary Note 13)

A meaning inference method inferring meaning of a column contained in a table, including:

selecting, by a computer, at least one candidate for meaning of a column whose meaning is to be inferred;

executing, by the computer, column similarity computation processing for computing, for each candidate for meaning selected, a score indicating a similarity between the selected candidate for meaning and meaning of each column other than the column whose meaning is to be inferred contained in a table; and identifying, by the computer, meaning of the column whose meaning is to be inferred from the candidates for meaning of the column with use of the score computed in the column similarity computation processing.

(Supplementary Note 14)

A meaning inference method inferring meaning of a column contained in a table, including:

selecting, by a computer, at least one candidate for meaning of a column whose meaning is to be inferred;

executing, by the computer, first column table similarity computation processing for computing, for each candidate for meaning selected, a score indicating a similarity between the selected candidate for meaning and meaning of a table; and identifying, by the computer, meaning of the column whose meaning is to be inferred from the candidates for meaning of the column with use of the score computed in the first column table similarity computation processing.

(Supplementary Note 15)

A meaning inference program causing a computer to infer meaning of a column contained in a table, the meaning inference program causing the computer to execute:

column meaning candidate selection processing for selecting at least one candidate for meaning of a column whose meaning is to be inferred;

column similarity computation processing for computing, for each candidate for meaning selected in the column meaning candidate selection processing, a score indicating a similarity between the selected candidate for meaning and meaning of each column other than the column whose meaning is to be inferred contained in a table; and column meaning identification processing for identifying meaning of the column whose meaning is to be inferred from the candidates for meaning of the column with use of the score computed in the column similarity computation processing.

(Supplementary Note 16)

A meaning inference program causing a computer to infer meaning of a column contained in a table, the meaning inference program causing the computer to execute:

column meaning candidate selection processing for selecting at least one candidate for meaning of a column whose meaning is to be inferred;

first column table similarity computation processing for computing, for each candidate for meaning selected in the column meaning candidate selection processing, a score indicating a similarity between the selected candidate for meaning and meaning of a table; and column meaning identification processing for identifying meaning of the column whose meaning is to be inferred from the candidates for meaning of the column with use of the score computed in the first column table similarity computation processing.

Although the present invention has been described above with reference to the exemplary embodiments, the present invention is not limited to the above exemplary embodiments. The configurations and the details of the present invention can be altered in various ways so as to be understandable by those skilled in the art within the scope of the present invention.

INDUSTRIAL APPLICABILITY

The present invention can suitably be applied to a meaning inference system that infers the meaning of each column of a table and the meaning of the table.

REFERENCE SIGNS LIST

1 Meaning inference system
2 Table storage unit
3 Data reading unit
4 Meaning set storage unit
5 Meaning initial value allocation unit
6 Table selection unit
7 Column meaning inference unit
8 Column meaning storage unit
9 Column meaning recording unit
10 Table meaning inference unit
11 Table meaning storage unit
12 Table meaning recording unit
13 End determination unit
71 Column selection unit
72 Column meaning candidate acquisition unit
73 Column meaning candidate selection unit
74 Column data score computation unit
75 Column similarity computation unit
76 First column table similarity computation unit
77 Column score computation unit
78 Column meaning identification unit
101 Table meaning candidate acquisition unit
102 Table meaning candidate selection unit
103 Second column table similarity computation unit
104 Table similarity computation unit
105 Table score computation unit
106 Table meaning identification unit

The invention claimed is:

1. A meaning inference system inferring meaning of a column contained in a table, comprising:
a column meaning candidate selection unit that selects at least one candidate for meaning of a column whose meaning is to be inferred;
a column similarity computation unit that computes, for each candidate for meaning selected by the column meaning candidate selection unit, a score indicating a similarity between the selected candidate for meaning and meaning of each column other than the column whose meaning is to be inferred contained in a table; and
a column meaning identification unit that identifies meaning of the column whose meaning is to be inferred from the candidates for meaning of the column with use of the score computed by the column similarity computation unit.

2. The meaning inference system according to claim 1, comprising:
a meaning initial value allocation unit that allocates an initial value for meaning of each column in the table; and
a column selection unit that selects the column whose meaning is to be inferred.

3. The meaning inference system according to claim 2, wherein the meaning initial value allocation unit allocates an initial value for meaning of the table, the meaning inference system comprising:
a first column table similarity computation unit that computes, for each candidate for meaning selected by the column meaning candidate selection unit, a score indicating a similarity between the selected candidate for meaning and the meaning of the table,
wherein the column meaning identification unit identifies the meaning of the column whose meaning is to be inferred with use of the score computed by the column similarity computation unit and the score computed by the first column table similarity computation unit.

4. The meaning inference system according to claim 2, wherein the meaning initial value allocation unit allocates to each of a plurality of given tables an initial value for meaning of each column contained in the table, the meaning inference system comprising:
a table selection unit that selects a table from the plurality of given tables,
wherein, until a predetermined condition is satisfied, a process is repeated in which the table selection unit selects a table from the plurality of given tables, in which the column selection unit selects a column whose meaning is to be inferred from the table selected by the table selection unit, and in which the column meaning identification unit identifies meaning of each column in the selected table.

5. The meaning inference system according to claim 3, wherein the meaning initial value allocation unit allocates to each of a plurality of given tables an initial value for meaning of the table and an initial value for meaning of each column contained in the table, the meaning inference system comprising:
a table selection unit that selects a table from the plurality of given tables,
wherein, until a predetermined condition is satisfied, a process is repeated in which the table selection unit selects a table from the plurality of given tables, in which the column selection unit selects a column whose meaning is to be inferred from the table selected by the table selection unit, and in which the column meaning identification unit identifies meaning of each column in the selected table.

6. A meaning inference system inferring meaning of a column contained in a table, comprising:
a column meaning candidate selection unit that selects at least one candidate for meaning of a column whose meaning is to be inferred;
a first column table similarity computation unit that computes, for each candidate for meaning selected by the column meaning candidate selection unit, a score indicating a similarity between the selected candidate for meaning and meaning of a table; and
a column meaning identification unit that identifies meaning of the column whose meaning is to be inferred from the candidates for meaning of the column with use of the score computed by the first column table similarity computation unit.

7. The meaning inference system according to claim 6, comprising:
- a meaning initial value allocation unit that allocates an initial value for meaning of the table and an initial value for meaning of each column in the table; and
- a column selection unit that selects the column whose meaning is to be inferred.

8. The meaning inference system according to claim 7, wherein the meaning initial value allocation unit allocates to each of a plurality of given tables an initial value for meaning of the table and an initial value for meaning of each column contained in the table, the meaning inference system comprising:
- a table selection unit that selects a table from the plurality of given tables,
  wherein, until a predetermined condition is satisfied, a process is repeated in which the table selection unit selects a table from the plurality of given tables, in which the column selection unit selects a column whose meaning is to be inferred from the table selected by the table selection unit, and in which the column meaning identification unit identifies meaning of each column in the selected table.

9. The meaning inference system according to claim 2, wherein the meaning initial value allocation unit allocates to each of a plurality of given tables an initial value for meaning of the table and an initial value for meaning of each column contained in the table, the meaning inference system comprising:
- a table selection unit that selects a table whose meaning is to be inferred from the plurality of given tables;
- a table meaning candidate selection unit that selects at least one candidate for meaning of the table whose meaning is to be inferred;
- a table similarity computation unit that computes, for each candidate for meaning selected by the table meaning candidate selection unit, a score indicating a similarity between the selected candidate for meaning and meaning of each table, other than the table whose meaning is to be inferred, related to the table whose meaning is to be inferred; and
- a table meaning identification unit that identifies meaning of the table whose meaning is to be inferred from the candidates for meaning of the table with use of the score computed by the table similarity computation unit.

10. The meaning inference system according to claim 2, wherein the meaning initial value allocation unit allocates to each of a plurality of given tables an initial value for meaning of the table and an initial value for meaning of each column contained in the table, the meaning inference system comprising:
- a table selection unit that selects a table whose meaning is to be inferred from the plurality of given tables;
- a table meaning candidate selection unit that selects at least one candidate for meaning of the table whose meaning is to be inferred;
- a second column table similarity computation unit that computes, for each candidate for meaning selected by the table meaning candidate selection unit, a score indicating a similarity between the selected candidate for meaning and meaning of each column in the table whose meaning is to be inferred; and
- a table meaning identification unit that identifies meaning of the table whose meaning is to be inferred from the candidates for meaning of the table with use of the score computed by the second column table similarity computation unit.

11. The meaning inference system according to claim 2, wherein the meaning initial value allocation unit allocates to each of a plurality of given tables an initial value for meaning of the table and an initial value for meaning of each column contained in the table, the meaning inference system comprising:
- a table selection unit that selects a table whose meaning is to be inferred from the plurality of given tables;
- a table meaning candidate selection unit that selects at least one candidate for meaning of the table whose meaning is to be inferred;
- a table similarity computation unit that computes, for each candidate for meaning selected by the table meaning candidate selection unit, a score indicating a similarity between the selected candidate for meaning and meaning of each table, other than the table whose meaning is to be inferred, related to the table whose meaning is to be inferred;
- a second column table similarity computation unit that computes, for each candidate for meaning selected by the table meaning candidate selection unit, a score indicating a similarity between the selected candidate for meaning and meaning of each column in the table whose meaning is to be inferred; and
- a table meaning identification unit that identifies meaning of the table whose meaning is to be inferred from the candidates for meaning of the table with use of the score computed by the table similarity computation unit and the score computed by the second column table similarity computation unit.

12. The meaning inference system according to claim 9, wherein, until a predetermined condition is satisfied, a process is repeated in which the table selection unit selects a table from the plurality of given tables, in which the column selection unit selects a column whose meaning is to be inferred from the table selected by the table selection unit, in which the column meaning identification unit identifies meaning of each column in the selected table, and in which the table meaning identification unit identifies meaning of each table.

13. A meaning inference method inferring meaning of a column contained in a table, comprising:
- selecting, by a computer, at least one candidate for meaning of a column whose meaning is to be inferred;
- executing, by the computer, column similarity computation processing for computing, for each candidate for meaning selected, a score indicating a similarity between the selected candidate for meaning and meaning of each column other than the column whose meaning is to be inferred contained in a table; and
- identifying, by the computer, meaning of the column whose meaning is to be inferred from the candidates for meaning of the column with use of the score computed in the column similarity computation processing.

* * * * *